US009135694B2

(12) United States Patent
Seppo et al.

(10) Patent No.: US 9,135,694 B2
(45) Date of Patent: Sep. 15, 2015

(54) SYSTEMS AND METHODS FOR USING AN IMMUNOSTAINING MASK TO SELECTIVELY REFINE ISH ANALYSIS RESULTS

(71) Applicant: General Electric Company, Schenectady, NY (US)

(72) Inventors: Antti Seppo, Niskayuna, NY (US); Yousef Al-Kofahi, Niskayuna, NY (US); Dirk R. Padfield, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 407 days.

(21) Appl. No.: 13/693,406

(22) Filed: Dec. 4, 2012

(65) Prior Publication Data

US 2014/0153811 A1 Jun. 5, 2014

(51) Int. Cl.
*G06K 9/00* (2006.01)
*G06T 7/00* (2006.01)

(52) U.S. Cl.
CPC ............. *G06T 7/0012* (2013.01); *G06T 7/0014* (2013.01); *G06T 2207/10064* (2013.01); *G06T 2207/30024* (2013.01); *G06T 2207/30072* (2013.01)

(58) Field of Classification Search
None
See application file for complete search history.

(56) References Cited

U.S. PATENT DOCUMENTS

| | | | |
|---|---|---|---|
| 7,570,797 B1 * | 8/2009 | Wang et al. | 382/145 |
| 7,629,125 B2 | 12/2009 | Sood et al. | |
| 7,741,046 B2 | 6/2010 | Larsen et al. | |
| 2003/0211491 A1 | 11/2003 | Mai | |
| 2005/0037406 A1 | 2/2005 | De La Torre-Bueno et al. | |
| 2006/0188140 A1 * | 8/2006 | Gholap et al. | 382/133 |
| 2007/0154958 A1 | 7/2007 | Hamann et al. | |
| 2007/0243545 A1 | 10/2007 | Kilpatrick et al. | |
| 2008/0241848 A1 | 10/2008 | Tsipouras et al. | |

(Continued)

FOREIGN PATENT DOCUMENTS

WO  2005076216 A2  8/2005

OTHER PUBLICATIONS

Fatima, M. M., and V. Seenivasagam. "A fast fuzzy-C means based marker controlled watershed segmentation of clustered nuclei." In Computer, Communication and Electrical Technology (ICCCET), 2011 International Conference on, pp. 186-192. IEEE, 2011.*

(Continued)

*Primary Examiner* — Sumati Lefkowitz
*Assistant Examiner* — Carol Wang
(74) *Attorney, Agent, or Firm* — Eileen B. Gallagher

(57) ABSTRACT

A computer-implemented method of processing image data representing biological units in a tissue sample includes receiving a first image of the tissue sample containing signals from an immunofluorescent (IF) morphological marker, wherein the tissue sample is stained with the IF morphological marker, and receiving a second image of the same tissue sample containing signals from a fluorescent probe, wherein the tissue sample is hybridized in situ with the fluorescent probe. The method further includes classifying each biological unit in the tissue sample into one of at least two classes based on a mean intensity of the signals from the IF morphological marker in the first image, performing a fluorescence in situ hybridization (FISH) analysis of the tissue sample in the second image to obtain results therefrom, and filtering the results of the FISH analysis to produce a subset of the results pertaining to biological units classified in one class.

12 Claims, 9 Drawing Sheets

(56) References Cited

U.S. PATENT DOCUMENTS

| | | |
|---|---|---|
| 2009/0245598 A1 | 10/2009 | Can et al. |
| 2010/0120053 A1 | 5/2010 | Cohen et al. |
| 2010/0184093 A1* | 7/2010 | Donovan et al. ............. 435/7.21 |
| 2010/0285023 A1 | 11/2010 | Albertson et al. |
| 2011/0091081 A1 | 4/2011 | Sarachan et al. |

OTHER PUBLICATIONS

Akakin, Hatice Cinar, Hui Kong, Camille Elkins, Jessica Hemminger, Barrie Miller, Jin Ming, Elizabeth Plocharczyk et al. "Automated detection of cells from immunohistochemically-stained tissues: Application to Ki-67 nuclei staining." In SPIE Medical Imaging, pp. 831503-831503. International Society for Optics and Photonics, 2012.*

Raimondo, Francesco, Marios A. Gavrielides, Georgia Karayannopoulou, Kleoniki Lyroudia, Ioannis Pitas, and Ioannis Kostopoulos. "Automated evaluation of Her-2/neu status in breast tissue from fluorescent in situ hybridization images." Image Processing, IEEE Transactions on 14, No. 9 (2005): 1288-1299.*

Nandy, Kaustav, Prabhakar R. Gudla, Karen J. Meaburn, Tom Misteli, and Stephen J. Lockett. "Automatic nuclei segmentation and spatial FISH analysis for cancer detection." In Engineering in Medicine and Biology Society, 2009. EMBC 2009. Annual International Conference of the IEEE, pp. 6718-6721. IEEE, 2009.*

Smochina, Cristian, Radu Rogojanu, Vasile Manta, and Walter Kropatsch. "Epithelial area detection in cytokeratin microscopic images using MSER segmentation in an anisotropic pyramid." In Pattern Recognition in Bioinformatics, pp. 318-329. Springer Berlin Heidelberg, 2011.*

Cheng, Jierong, and Jagath C. Rajapakse. "Segmentation of clustered nuclei with shape markers and marking function." Biomedical Engineering, IEEE Transactions on 56, No. 3 (2009): 741-748.*

Yu, Weimiao, Hwee Kuan Lee, Srivats Hariharan, Shvetha Sankaran, Pascal Vallotton, and Sohail Ahmed. "Segmentation of neural stem/progenitor cells nuclei within 3-D neurospheres." In Advances in Visual Computing, pp. 531-543. Springer Berlin Heidelberg, 2009.*

Jones, Thouis R., Anne Carpenter, and Polina Golland. "Voronoi-based segmentation of cells on image manifolds." In Computer Vision for Biomedical Image Applications, pp. 535-543. Springer Berlin Heidelberg, 2005.*

PCT Search Report and Written Opinion issued in connection with corresponding PCT Application No. PCT/US2013/068425 dated Mar. 14, 2014.

Lehr et al., Quantitative evaluation of HER-2/neu status in breast cancer by fluorescence un situ hybridization and by immunohistochemistry with image analysis, American society of clinical pathologists, pp. 814-822, 2001.

Speel et al., Combined immunocytochemistry and fluorescence in situ hybridization for simultaneous tricolor detection of cell cycle, genomic, and phenotypic parameters of tumor cells, The journal of histochemistry and cytochemistry, pp. 961-966 Feb. 1994.

Theodosiou et al., Automated analysis of FISH and immunohistochemistry images: a review, International Society for Analytical Cytology, pp. 439-450, Mar. 2007.

Wiley, High-quality HER-2 testing, The journal of American Medical Association, pp. 2019-2020, Apr. 2004.

Ye et al., Combined multi-color-FISH and immunostaining, Cytogenetic and Genome Research, pp. 227-234, Feb. 2006.

* cited by examiner

SYSTEMS AND METHODS FOR USING AN IMMUNOSTAINING MASK TO SELECTIVELY REFINE ISH ANALYSIS RESULTS

FIELD

This disclosure relates generally to the detection of protein expression and target nucleic acid sequences in a biological sample, and more particularly, to systems and methods for using an immunostaining mask to selectively refine in situ hybridization (ISH) analysis results.

BACKGROUND

Analysis of proteins in histological sections and other cytological preparations may be performed using fluorescence in situ hybridization (FISH). FISH is a cytogenetic technique for detecting and localizing the presence or absence of specific DNA sequences on chromosomes. FISH uses fluorescent probes that bind to only those parts of the chromosome with which they show a high degree of sequence complementarity. Fluorescence microscopy can be used to find out where the fluorescent probe is bound to the chromosomes by counting the fluorescent dots present in an image.

For FISH analysis in carcinoma tumor samples, the measurement of the FISH dot counts is relevant only for the epithelial cells in a sample. However, conventional FISH analysis measures the FISH signal for all cells in a field of view because there lacks an effective way of limiting the analysis to a defined subset of cells. In the absence of manual intervention, this can lead to many non-epithelial cells (such as stromal cells) contributing to the FISH dot counting statistics, which leads to less accurate dot counting measurements.

SUMMARY

According to one embodiment, a computer-implemented method of processing image data representing biological units in a tissue sample, where the computer includes a processor, includes receiving, by the processor, a first image of the tissue sample containing signals from an immunofluorescent (IF) morphological marker, wherein the tissue sample is stained with the IF morphological marker, and receiving, by the processor, a second image of the same tissue sample containing signals from a fluorescent probe, wherein the tissue sample is hybridized in situ with the fluorescent probe. The method further includes classifying, by the processor, each biological unit in the tissue sample into one of at least two classes based on a mean intensity of the signals from the IF morphological marker in the first image, performing, by the processor, a fluorescence in situ hybridization (FISH) analysis of the tissue sample in the second image to obtain results therefrom, and filtering, by the processor, the results of the FISH analysis to produce a subset of the results pertaining to biological units classified in one of the at least two classes only. In some embodiments, the classes may include epithelial and non-epithelial cells.

In some embodiments, the method may further include registering, by the processor, locations of signals from the IF morphological marker in the first image with locations of signals from the fluorescent probe in the second image to produce a registered image. In some embodiments, the method may further include segmenting, by the processor, the second image to identify nuclei in the tissue sample based on the locations of signals from the fluorescent probe in the second image. In some embodiments, each biological unit may correspond to respective nuclei identified in the tissue sample. In some embodiments, the act of segmenting the nuclei may include applying, by the processor, a wavelet transform to the second image.

In some embodiments, the method may further include generating, by the processor, a Voronoi partition and rings generated from a threshold distance map from the nuclei in the second image in which each respective ring is constrained to at least partially surround only one nucleus in the tissue sample. In some embodiments, the act of generating the Voronoi partition in the second image may enable generating local background regions from the second image using nuclei identified in the tissue sample as seeds of the Voronoi partition multiplied by a mask defined by each ring.

In some embodiments, the IF morphological marker may be configured to target a cytokeratin (CK) protein. The method may further include thresholding the first image using a threshold value in conjunction with Otsu's thresholding method and estimating a minimum intensity level of an epithelial region in the first image. In some embodiments, the method may further include changing the threshold value interactively by a user while observing a change in classification of each biological unit.

In some embodiments, each nucleus may be classified as epithelial or non-epithelial by computing a mean cytokeratin (CK) intensity within the ring surrounding the nucleus and comparing the mean CK intensity to the estimated minimum intensity level of the epithelial region. In some embodiments, the IF morphological marker may include a 4',6-diamidino-2-phenylindole (DAPI) stain. In some embodiments, the IF morphological marker may be configured to target at least one of a cytokeratin (CK) protein and a Human Epidermal Growth Factor Receptor 2 (HER2) protein. In some embodiments, the fluorescent probe may be configured to bind to least one of a HER2 gene and a Chromosome 17 centrometric repeat.

According to one embodiment, a non-transitory computer-readable medium has stored thereon computer-executable instructions that when executed by a computer cause the computer to receive a first image of a tissue sample containing signals from an immunofluorescent (IF) morphological marker, wherein the tissue sample is stained with the IF morphological marker, and receive a second image of the same tissue sample containing signals from a fluorescent probe, wherein the tissue sample is hybridized in situ with the fluorescent probe. The computer readable medium further includes computer-executable instructions that when executed by the computer cause the computer to classify each biological unit in the tissue sample into one of at least two classes based on a mean intensity of the signals from the IF morphological marker in the first image, perform a fluorescence in situ hybridization (FISH) analysis of the tissue sample in the second image to obtain results therefrom, and filter the results of the FISH analysis to produce a subset of the results pertaining to biological units classified as epithelial only.

In some embodiments, the computer readable medium may further include computer-executable instructions that when executed by the computer cause the computer to register locations of signals from the IF morphological marker in the first image with locations of signals from the fluorescent probe in the second image to produce a registered image. In some embodiments, the computer readable medium may further include computer-executable instructions that when executed by the computer cause the computer to segment the second image to identify nuclei in the tissue sample based on the locations of signals from the fluorescent probe in the second image.

According to one embodiment, a system for processing image data representing biological units in a tissue sample includes a processor, an input in electrical communication with the processor and configured to receive the image data, and a memory in electrical communication with the processor. The memory includes computer-executable instructions that when executed by the processor cause the processor to receive a first image of a tissue sample containing signals from an immunofluorescent (IF) morphological marker, wherein the tissue sample is stained with the IF morphological marker, receive a second image of the same tissue sample containing signals from a fluorescent probe, wherein the tissue sample is hybridized in situ with the fluorescent probe, classify each biological unit in the tissue sample into one of at least two classes based on a mean intensity of the signals from the IF morphological marker in the first image, perform a fluorescence in situ hybridization (FISH) analysis of the tissue sample in the second image to obtain results therefrom, and filter the results of the FISH analysis to produce a subset of the results pertaining to biological units classified in one of the at least two classes only. In some embodiments, the classes may include epithelial and non-epithelial cells.

In some embodiments, the memory may further include computer-executable instructions that when executed by the processor cause the processor to register locations of signals from the IF morphological marker in the first image with locations of signals from the fluorescent probe in the second image to produce a registered image. In some embodiments, the memory may further include computer-executable instructions that when executed by the processor cause the processor to segment the second image to identify nuclei in the tissue sample based on the locations of signals from the fluorescent probe in the second image. In some embodiments, each biological unit may correspond to respective nuclei identified in the tissue sample.

In some embodiments, the memory may further include computer-executable instructions that when executed by the processor cause the processor to apply a wavelet transform to the second image to segment the nuclei in the tissue sample. In some embodiments, the memory may further include computer-executable instructions that when executed by the processor cause the processor to generate a Voronoi partition and rings generated from a threshold distance map from the nuclei in the second image in which each respective ring is constrained to at least partially surround only one nucleus in the tissue sample. In some embodiments, the memory may further include computer-executable instructions that when executed by the processor cause the processor to generate local background regions from the second image using nuclei identified in the tissue sample as seeds of the Voronoi partition multiplied by a mask defined by each ring.

In some embodiments, the IF morphological marker may include a 4',6-diamidino-2-phenylindole (DAPI) stain. In some embodiments, the IF morphological marker may be configured to target at least one of a cytokeratin (CK) protein and a Human Epidermal Growth Factor Receptor 2 (HER2) protein. In some embodiments, the fluorescent probe may be configured to bind to least one of a HER2 gene and a Chromosome 17 centrometric repeat.

BRIEF DESCRIPTION OF THE DRAWINGS

Features and aspects of embodiments are described below with reference to the accompanying drawings, in which elements are not necessarily depicted to scale.

DETAILED DESCRIPTION

Figure 1:
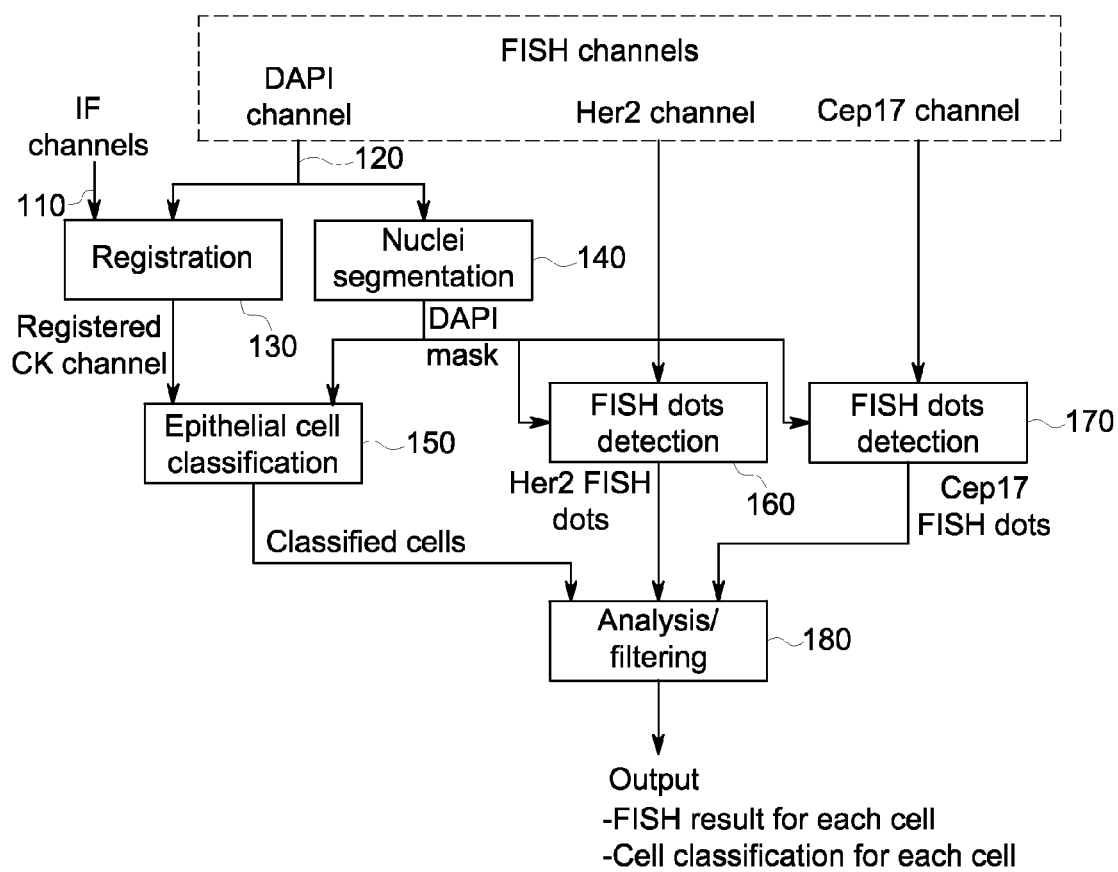
FIG. 1 is a block diagram of one example of a process for processing image data representing biological units in a tissue sample, in accordance with one embodiment.

Exemplary embodiments are directed to systems and methods for combining information from images of immunofluorescence (IF) staining and fluorescence in situ hybridization (FISH) staining of the same biological specimen to enable accurate automated computation of FISH analysis results.

DEFINITIONS

To more clearly and concisely describe and point out the subject matter of the claimed invention, the following definitions are provided for specific terms, which are used in the following description and the appended claims.

The singular forms "a" "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Unless otherwise indicated, all numbers expressing quantities of ingredients, properties such as molecular weight, reaction conditions, so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least each numerical parameter should at least be construed in light of the number of reported significant digits and by applying ordinary rounding techniques.

As used herein, the term "binder" refers to a molecule that may bind to one or more targets in the biological sample. A binder may specifically bind to a target. Suitable binders may include one or more of natural or modified peptides, proteins (e.g., antibodies, affibodies, or aptamers), nucleic acids (e.g., polynucleotides, DNA, RNA, or aptamers); polysaccharides (e.g., lectins, sugars), lipids, enzymes, enzyme substrates or inhibitors, ligands, receptors, antigens, or haptens. A suitable binder may be selected depending on the sample to be analyzed and the targets available for detection. For example, a target in the sample may include a ligand and the binder may include a receptor or a target may include a receptor and the binder may include a ligand. Similarly, a target may include an antigen and the binder may include an antibody or antibody fragment or vice versa. In some embodiments, a target may include a nucleic acid and the binder may include a complementary nucleic acid. In some embodiments, both the target and the binder may include proteins capable of binding to each other.

As used herein, the term "biological sample" refers to a sample obtained from a biological subject, including sample of biological tissue or fluid origin obtained in vivo or in vitro. Such samples can be, but are not limited to, body fluid (e.g., blood, blood plasma, serum, or urine), organs, tissues, fractions, and cells isolated from mammals including, humans. Biological samples also may include sections of the biological sample including tissues (e.g., sectional portions of an organ or tissue). Biological samples may also include extracts from a biological sample, for example, an antigen from a biological fluid (e.g., blood or urine).

A biological sample may be of prokaryotic origin or eukaryotic origin (e.g., insects, protozoa, birds, fish, reptiles). In some embodiments, the biological sample is mammalian (e.g., rat, mouse, cow, dog, donkey, guinea pig, or rabbit). In certain embodiments, the biological sample is of primate origin (e.g., example, chimpanzee, or human).

As used herein, the term "probe" refers to an agent having a binder and a label, such as a signal generator or an enzyme. In some embodiments, the binder and the label (signal generator or the enzyme) are embodied in a single entity. The binder and the label may be attached directly (e.g., via a fluorescent molecule incorporated into the binder) or indirectly (e.g., through a linker, which may include a cleavage site) and applied to the biological sample in a single step. In alternative embodiments, the binder and the label are embodied in discrete entities (e.g., a primary antibody capable of binding a target and an enzyme or a signal generator-labeled secondary antibody capable of binding the primary antibody). When the binder and the label (signal generator or the enzyme) are separate entities they may be applied to a biological sample in a single step or multiple steps. As used herein, the term "fluorescent probe" refers to an agent having a binder coupled to a fluorescent signal generator.

As used herein, the term "signal generator" refers to a molecule capable of providing a detectable signal using one or more detection techniques (e.g., spectrometry, calorimetry, spectroscopy, or visual inspection). Suitable examples of a detectable signal may include an optical signal, and electrical signal, or a radioactive signal. Examples of signal generators include one or more of a chromophore, a fluorophore, a Raman-active tag, or a radioactive label. As stated above, with regard to the probe, the signal generator and the binder may be present in a single entity (e.g., a target binding protein with a fluorescent label) in some embodiments. Alternatively, the binder and the signal generator may be discrete entities (e.g., a receptor protein and a labeled-antibody against that particular receptor protein) that associate with each other before or upon introduction to the sample.

As used herein, the term "fluorophore" or "fluorescent signal generator" refers to a chemical compound, which when excited by exposure to a particular wavelength of light, emits light at a different wavelength. Fluorophores may be described in terms of their emission profile, or "color." Green fluorophores (for example Cy3, FITC, and Oregon Green) may be characterized by their emission at wavelengths generally in the range of 515-540 nanometers. Red fluorophores (for example Texas Red, Cy5, and tetramethylrhodamine) may be characterized by their emission at wavelengths generally in the range of 590-690 nanometers. Examples of fluorophores include, but are not limited to, 4-acetamido-4'-isothiocyanatostilbene-2,2'disulfonic acid, acridine, derivatives of acridine and acridine isothiocyanate, 5-(2'-aminoethyl)aminonaphthalene-1-sulfonic acid (EDANS), 4-amino-N-[3-vinylsulfonyl)phenyl]naphthalimide-3,5 disulfonate (LuciferYellowVS), N-(4-anilino-1-naphthyl)maleimide, anthranilamide, Brilliant Yellow, coumarin, coumarin derivatives, 7-amino-4-methylcoumarin (AMC, Coumarin 120), 7-amino-trifluoromethylcouluarin (Coumaran 151), cyanosine; 4',6-diaminidino-2-phenylindole (DAPI), 5',5''-dibromopyrogallol-sulfonephthalein (Bromopyrogallol Red), 7-diethylamino-3-(4'-isothiocyanatophenyl)4-methylcoumarin, -, 4,4'-diisothiocyanatodihydro-stilbene-2,2'-disulfonic acid, 4,4'-diisothiocyanatostilbene-2,2'-disulfonic acid, 5-[dimethylamino]naphthalene-1-sulfonyl chloride (DNS, dansyl chloride), eosin, derivatives of eosin such as eosin isothiocyanate, erythrosine, derivatives of erythrosine such as erythrosine B and erythrosin isothiocyanate; ethidium; fluorescein and derivatives such as 5-carboxyfluorescein (FAM), 5-(4,6-dichlorotriazin-2-yl)aminofluorescein (DTAF), 2'7'-dimethoxy-4'5'-dichloro-6-carboxyfluorescein (JOE), fluorescein, fluorescein isothiocyanate (FITC), QFITC (XRITC); fluorescamine derivative (fluorescent upon reaction with amines); IR144; IR1446; Malachite Green isothiocyanate; 4-methylumbelliferone; ortho cresolphthalein; nitrotyrosine; pararosaniline; Phenol Red, B-phycoerythrin; o-phthaldialdehyde derivative (fluorescent upon reaction with amines); pyrene and derivatives such as pyrene, pyrene butyrate and succinimidyl 1-pyrene butyrate; Reactive Red 4 (Cibacron® Brilliant Red 3B-A), rhodamine and derivatives such as 6-carboxy-X-rhodamine (ROX), 6-carboxyrhodamine (R6G), lissamine rhodamine B sulfonyl chloride, rhodamine (Rhod), rhodamine B, rhodamine 123, rhodamine X isothiocyanate, sulforhodamine B, sulforhodamine 101 and sulfonyl chloride derivative of sulforhodamine 101 (Texas Red); N,N,N',N'-tetramethyl-6-carboxyrhodamine (TAMRA); tetramethyl Rhodamine, tetramethyl rhodamine isothiocyanate (TRITC); riboflavin; rosolic acid and lathanide chelate derivatives, quantum dots, cyanines, pyrelium dyes, and squaraines.

As used herein, the term "in situ" generally refers to an event occurring in the original location, for example, in intact organ or tissue or in a representative segment of an organ or tissue. In some embodiments, in situ analysis of targets may be performed on cells derived from a variety of sources, including an organism, an organ, tissue sample, or a cell culture. In situ analysis provides contextual information that may be lost when the target is removed from its site of origin. Accordingly, in situ analysis of targets describes analysis of target-bound probe located within a whole cell or a tissue sample, whether the cell membrane is fully intact or partially intact where target-bound probe remains within the cell. Furthermore, the methods disclosed herein may be employed to analyze targets in situ in cell or tissue samples that are fixed or unfixed.

As used herein, the terms "irradiation" or "irradiate" refer to act or process of exposing a sample or a solution to non-ionizing radiation. In some embodiments, the non-ionizing irradiation has wavelengths between 350 nm and 1.3 um. In preferred embodiments, the non-ionizing radiation is visible light of 400-700 nm in wavelength. Irradiation may be accomplished by exposing a sample or a solution to a radiation source, e.g., a lamp, capable of emitting radiation of a certain wavelength or a range of wavelengths. In some embodiments, a molecule capable of undergoing photoexcitation is photoexcited as a result of irradiation. In some embodiments, the molecule capable of undergoing photoexcitation is a signal generator, e.g., a fluorescent signal generator. In some embodiments, irradiation of a fluorescent signal generator initiates a photoreaction between the fluorescent signal generator and the signal inactivation agent. In some embodiments, irradiation initiates a photoreaction that substantially inactivates the signal generator by photoactivated chemical bleaching. In other embodiments the signal inactivation agent undergoes photoexcitation to generate a reactive moiety that reacts with the signal generator to inactivate the signal. Optical filters may be used to restrict irradiation of a sample or a solution to a particular wavelength or a range of wavelengths. In some embodiments, the optical filters may be used to restrict irradiation to a narrow range of wavelengths for selective photoexcitation of one or more molecules capable of undergoing photoexcitation.

As used herein, the term "selective photoexcitation" refers to an act or a process, whereby one or more molecules capable of undergoing photoexcitation are photoexcited in the presence of one or more other molecules capable of undergoing photoexcitation that remain in the ground electronic state after irradiation.

In some embodiments, the molecule capable of undergoing photoexcitation is a fluorescent dye, e.g., a cyanine dye. In one further embodiment, irradiation limited to a range of wavelengths between 620-680 nm is used for selective photoexcitation of a Cy5 dye. In alternative embodiments, irradiation of a sample at a specific wavelength may also be accomplished by using a laser.

General Description of Exemplary Embodiments

In one embodiment, determination of cell type (e.g., epithelial or non-epithelial) in a biological specimen can be automated using an IF marker, where the strength of the IF signal defines whether a given cell in the specimen is of interest. Images containing IF and FISH markers can be multiplexed by iterative analysis techniques, and each cell can be automatically classified by its type (e.g., epithelial or non-epithelial). This enables the FISH analysis to be restricted to the cells of interest (e.g., epithelial cells) for accurate, completely automated counting statistics. Although IF and FISH are mutually exclusive techniques, they can be performed at the same time or sequentially. Methods of iteratively analyzing an individual sample are described, for example, in U.S. Pat. No. 7,629,125 and U.S. Pat. No. 7,741,046, each of which is hereby incorporated by reference in its entirety.

FIG. 1 is a block diagram showing one example of a process for selectively refining FISH results, according to one embodiment. The inputs to the process are stained DAPI images from a FISH staining set and CK and/or Human Epidermal Growth Factor Receptor 2 (Her2) IF images from an IF staining round. Some embodiments can be used for standard formalin fixed paraffin embedded (FFPE) samples of human tumors. For example, breast cancer samples can be used. In this example, the samples are cut to 4 micrometer thin sections that are placed on microscope slides and processed for immunostaining using conventional methods.

Figure 2:
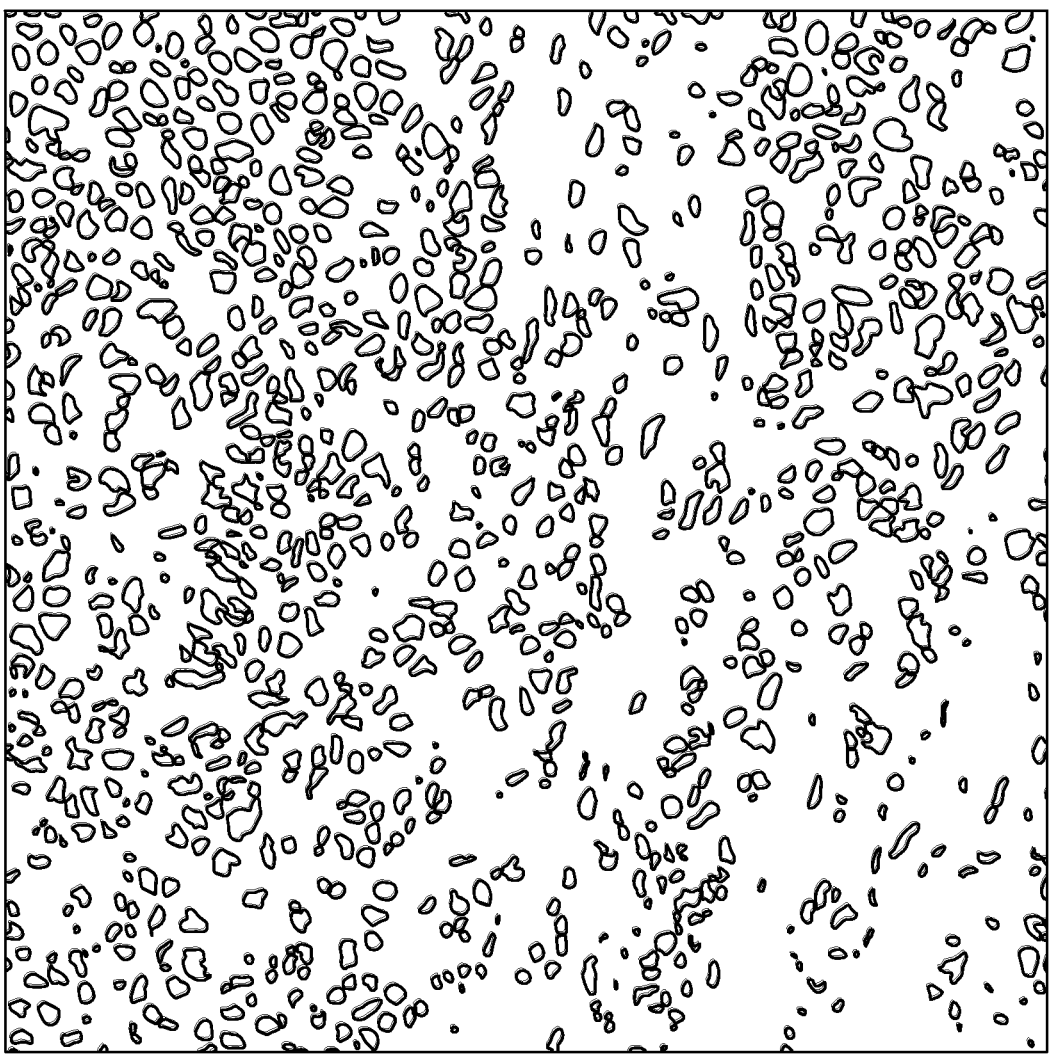
FIG. 2 depicts an exemplary DAPI image.
Figure 3:
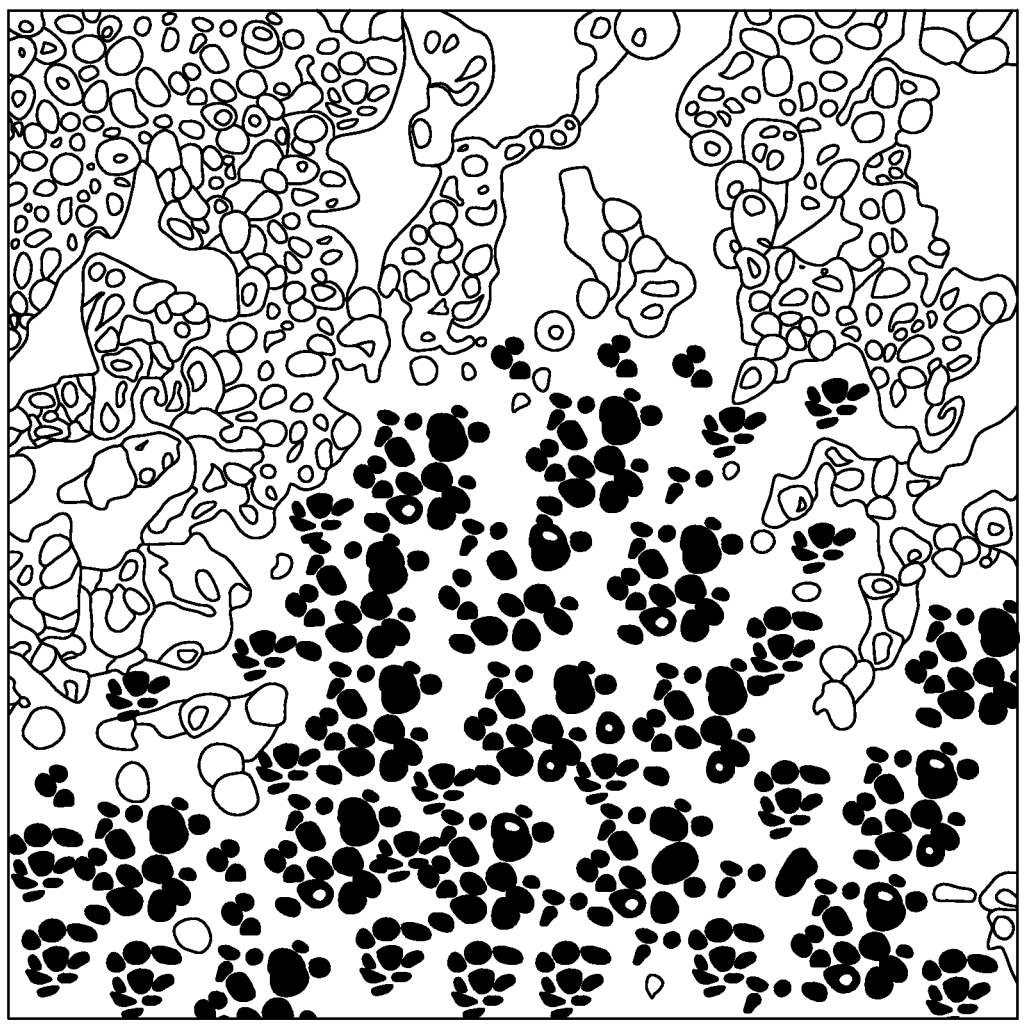
FIG. 3 depicts an exemplary cytokeratin image.

In the first staining step, immunofluorescence (IF) staining for cytokeratin (CK) and/or Human Epidermal Growth Factor Receptor 2 (Her2) as well as DAPI staining are performed, and corresponding fluorescence images are recorded. Next, the slides are stained for Her2 and CEP17 FISH, DAPI stained, and then imaged from the same positions as for the IF staining. This process yields two sets of images of the exact same cells in the sample. One set of images contains corresponding DAPI, CK and Her2 IF signals (indicated as input 110) and the other set of images contains corresponding DAPI, Her2 FISH and CEP17 FISH signals (indicated as input 120). FIG. 2 depicts an exemplary DAPI image, and FIG. 3 depicts a corresponding cytokeratin image. The IF and FISH imaging rounds are then registered (indicated at 130) using their respective DAPI signals, and image analysis algorithms are used to segment (140), classify (150), and measure (160) the signals. The output of the process includes the results of the analysis filtered according to the classification of the cells in the images (e.g., to remove the non-epithelial cells from the results).

Figure 4:
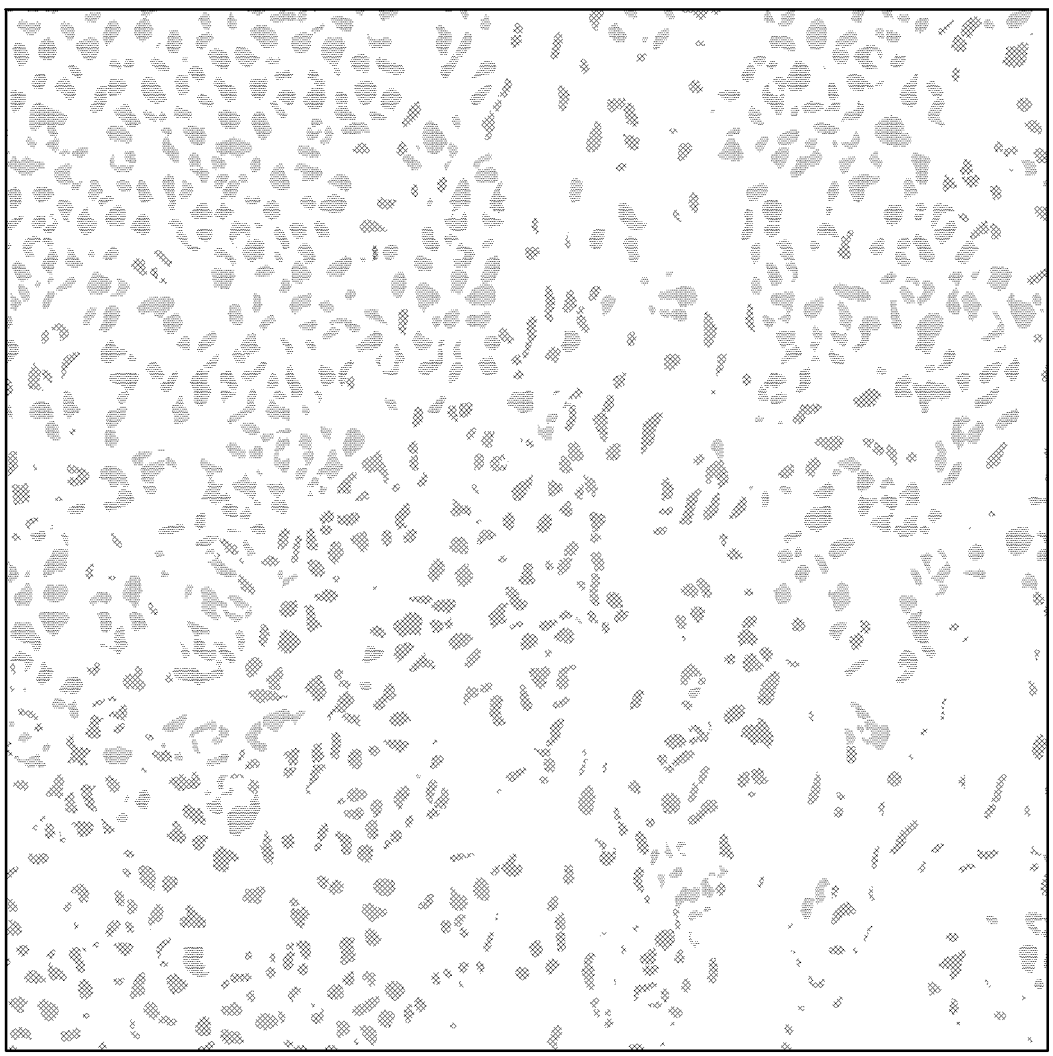
FIG. 4 depicts one example of the DAPI image of FIG. 2 with nuclei segmented, in accordance with one embodiment.
Figure 5:
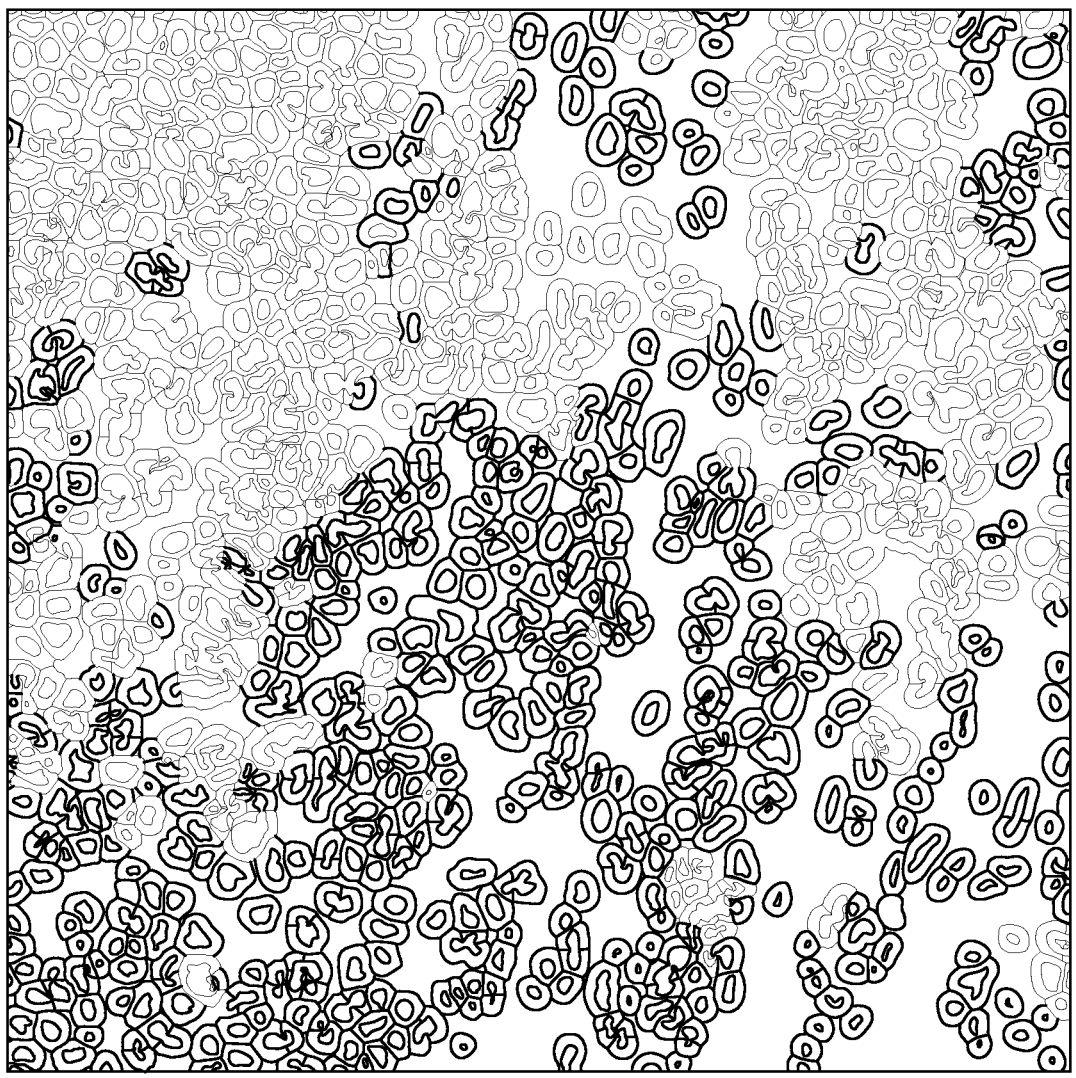
FIG. 5 depicts one example of the DAPI image of FIG. 4 showing rings around each segmented nucleus with corresponding influence zones, in accordance with one embodiment.
Figure 6:
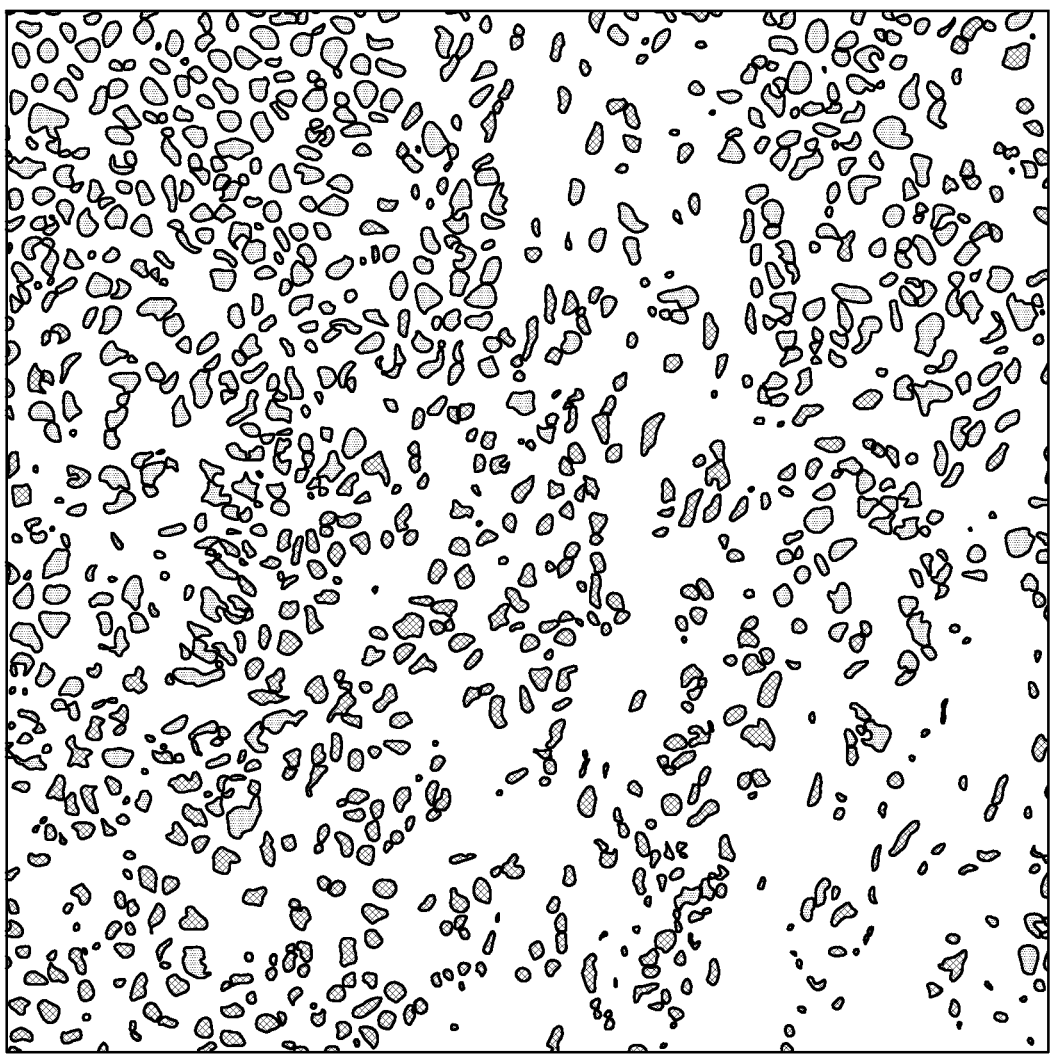
FIG. 6 depicts an exemplary overlay image subsequent to processing, in accordance with one embodiment.

The classification of the cells (e.g., as epithelial or non-epithelial) can begin by segmenting the nuclei in the DAPI image using a wavelet segmentation technique followed by a step to separate the touching nuclei. Applying a distance transform to the segmented nuclei and thresholding this distance will lead to a set of rings around each nucleus that approximates the influence zone of the cytoplasm as depicted in FIG. 4. To generate a unique cytoplasm ring for each nucleus and to avoid having these rings overlapping other nuclei (which would lead to incorrect measurement regions), a Voronoi partition can be used to constrain the influence zone of the rings. This may, for example, be accomplished by a watershed segmentation using the nuclei segmentations as the seeds multiplied by the mask created by the rings. The mean intensity of the IF channel can then be measured in these constrained rings to determine whether the cells are epithelial or not by comparing the mean intensity value to a threshold value. The result of the Voronoi partitioning is that isolated cells have the full ring around them whereas cells that are closely packed have constrained regions, such as depicted in FIG. 5. FISH signals on all cells can then be processed using a FISH dot counting algorithm (160, 170). The results from the FISH dot counting algorithm (160, 170) can be filtered (180) according to the epithelial/non-epithelial classifications to yield FISH analysis form epithelial cells only. FIG. 6 depicts one example of an overlay of the DAPI and cytokeratin images of FIGS. 2 and 3, respectively, after processing using the above-described exemplary process.

In another embodiment, the IF image contains a cytokeratin (CK) marker and can be thresholded using Otsu's thresholding method to estimate a minimum intensity level of an epithelial region in the first image. Each nucleus can be classified as epithelial or non-epithelial by computing a mean cytokeratin (CK) intensity within the ring surrounding the nucleus and comparing the mean CK intensity to the estimated minimum intensity level of the epithelial region. In another embodiment, the threshold value can be changed interactively by the user while observing the change in classification of, for example, epithelial versus non-epithelial cells. In yet another embodiment, an interactive tool is provided to allow a user to select epithelial regions that shows the image in question and allow user to modify the selection by means of a "slider" that changes the intensity threshold for included region.

Figure 7:
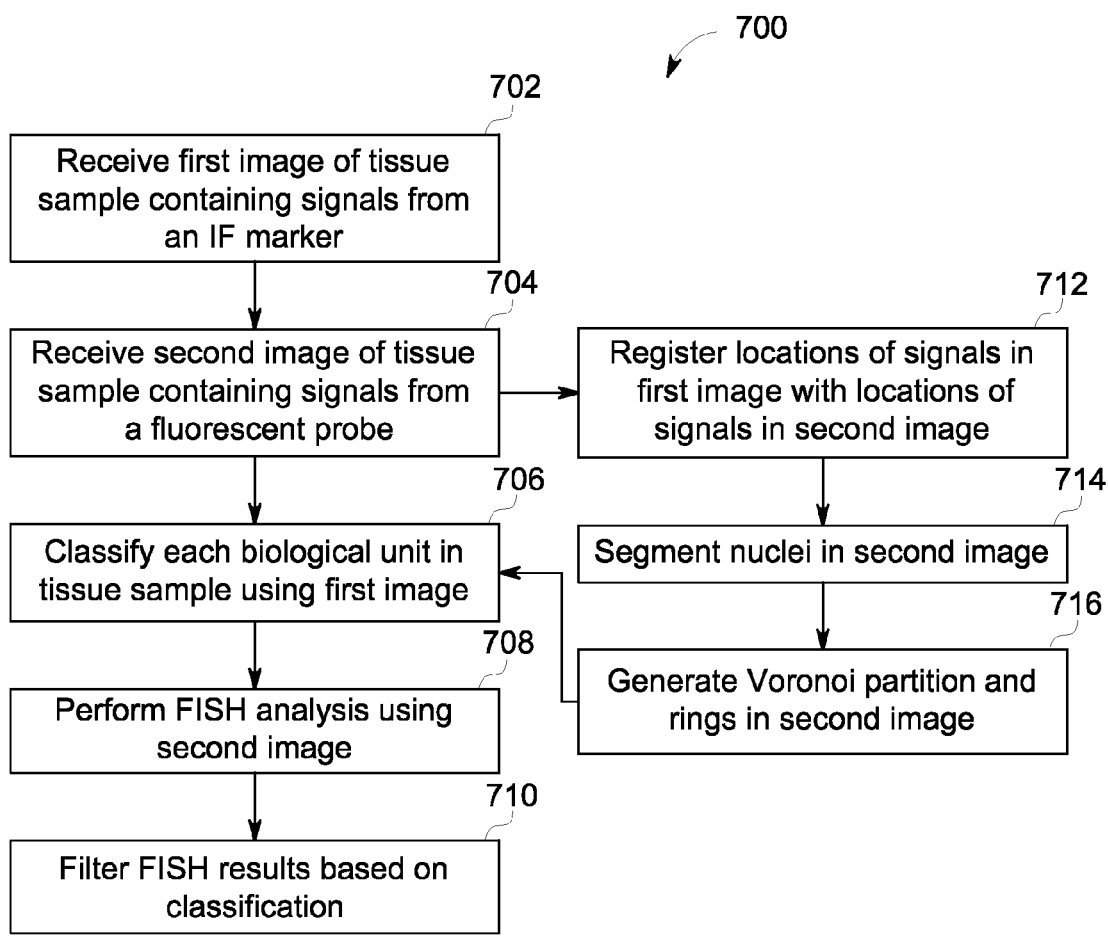
FIG. 7 is a flow diagram of one example of a process for processing image data representing biological units in a tissue sample, in accordance with one embodiment.

FIG. 7 is a flow diagram of one example of an image analysis process 700, according to one embodiment. At step 702, a first image of a tissue sample containing signals from an IF morphological marker is received, for example, by a processor. At step 704, a second image of the same tissue sample containing signals from a fluorescent probe is received. The tissue sample may, for example, be hybridized in situ with the fluorescent probe.

At step 706, each biological unit in the first image is classified into one of at least two classes, for example, epithelial and non-epithelial. At step 708, FISH analysis is performed using the second image. At step 710, the results of the FISH analysis are filtered according to the classification of each biological unit. For example, only results pertaining to the cells classified as epithelial may be preserved, while the results pertaining to other cells may be discarded.

In some embodiments, the classification step 706 can be performed after the nuclei in the second image have been segmented. Segmentation can be accomplished by first registering the locations of signals in the first image with the locations of signals in the second image (step 712). This registration enables the first and second images to be aligned with respect to the cells. At step 714, the nuclei may be segmented using a wavelet transform applied to the second image. At step 716, a Voronoi partition and rings are generated from a threshold distance map from the segmented nuclei. The rings may be constrained to at least partially surround only one nucleus, to facilitate the classification performed at step 706, such as described above with respect to FIG. 1. The Voronoi partition enables generating local background regions in the second image using nuclei as seeds of the partition multiplied by a mask defined by each ring.

Other Exemplary Embodiments

In some embodiments, the biological specimen may contain multiple targets adhered to a solid support. In some embodiments, a biological specimen may include a tissue sample, a whole cell, a cell constituent, a cytospin, or a cell smear. In some embodiments, a biological specimen may include a tissue sample or tissue components. The tissue sample may include a collection of similar cells obtained from a tissue of a biological subject that may have a similar function. In some embodiments, a tissue sample may include a collection of similar cells obtained from a tissue of a human. Suitable examples of human tissues include, but are not limited to, (1) epithelium; (2) the connective tissues, including blood vessels, bone and cartilage; (3) muscle tissue; and (4) nerve tissue. The source of the tissue sample may be solid tissue obtained from a fresh, frozen and/or preserved organ or tissue sample or biopsy or aspirate; blood or any blood constituents; bodily fluids such as cerebral spinal fluid, amniotic fluid, peritoneal fluid, or interstitial fluid; or cells from any time in gestation or development of the subject. In some embodiments, the tissue sample may include primary or cultured cells, circulating disease or normal cells, activated leukocytes responding to an infectious agent, or cell lines.

In some embodiments, a biological specimen includes tissue sections from healthy or diseased tissue samples (e.g., tissue section from colon, breast tissue, prostate). A tissue section may include a single part or piece of a tissue sample, for example, a thin slice of tissue or cells cut from a tissue sample. In some embodiments, multiple sections of tissue samples may be taken, e.g. a tissue microarray, and subjected to analysis by IF and FISH. In some embodiments, the same section of tissue sample may be analyzed at both morphological and molecular levels. A tissue section, if employed as a biological sample, may have a thickness in a range that is less than about 100 micrometers, in a range that is less than about 50 micrometers, in a range that is less than about 25 micrometers, or in range that is less than about 10 micrometers.

In some embodiments, a biological sample or the targets in the biological sample may be adhered to a solid support. A solid support may include microarrays (e.g., DNA or RNA microarrays), gels, blots, glass slides, beads, or ELISA plates. In some embodiments, a biological sample or the targets in the biological sample may be adhered to a membrane selected from nylon, nitrocellulose, and polyvinylidene difluoride. In some embodiments, the solid support may include a plastic surface selected from polystyrene, polycarbonate, and polypropylene.

A biological sample in accordance with one embodiment of the invention may be solid or fluid. Suitable examples of biological samples may include, but are not limited to, cultures, blood, plasma, serum, saliva, cerebral spinal fluid, pleural fluid, milk, lymph, sputum, semen, urine, stool, tears, saliva, needle aspirates, external sections of the skin, respiratory, intestinal, and genitourinary tracts, tumors, organs, cell cultures or cell culture constituents, or solid tissue sections. In some embodiments, the biological sample may be analyzed as is, that is, without harvest and/or isolation of the target of interest.

A biological sample may include any of the aforementioned samples regardless of their physical condition, such as, but not limited to, being frozen or stained or otherwise treated. In some embodiments, a biological sample may include compounds which are not naturally intermixed with the sample in nature such as preservatives, anticoagulants, buffers, fixatives, nutrients, antibiotics, or the like.

The sample may be a frozen tissue section or a paraffin embedded sample. Parrafin samples refer to those samples wherein the biological sample has been previously fixed, for example in paraformaldehyde followed by embedding in wax. In some embodiments, the tissue sample may be first fixed and then dehydrated through an ascending series of alcohols, infiltrated and embedded with paraffin or other sectioning media so that the tissue sample may be sectioned. In an alternative embodiment, a tissue sample may be sectioned and subsequently fixed. In some embodiments, the tissue sample may be embedded and processed in paraffin. Examples of paraffin that may be used include, but are not limited to, Paraplast, Broloid, and Tissuemay. Once the tissue sample is embedded, the sample may be sectioned by a microtome into sections that may have a thickness in a range of from about three microns to about five microns. Once sectioned, the sections may be attached to slides using adhesives. Examples of slide adhesives may include, but are not limited to, silane, gelatin, poly-L-lysine. In embodiments, if paraffin is used as the embedding material, the tissue sections may be deparaffinized and rehydrated in water. The tissue sections may be deparaffinized, for example, by using organic agents, such as xylenes and gradually descending series of alcohols, or detergents.

In some embodiments, aside from the sample preparation procedures discussed above, the tissue section may be subjected to further treatment prior to, during, or following in situ hybridization and/or immunohistochemistry. For example, in some embodiments, the tissue section may be subjected to epitope retrieval methods, such as, heating of the tissue sample in citrate buffer. In some embodiments, a tissue section may be optionally subjected to a blocking step to minimize any non-specific binding.

Suitability of targets to be analyzed may be determined by the type and nature of analysis required for the biological sample. In some embodiments, a target may provide information about the presence or absence of an analyte in the biological sample. In another embodiment, a target may provide information on a state of a biological sample. For example, if the biological sample includes a tissue sample, the methods disclosed herein may be used to detect targets that may help in comparing different types of cells or tissues, comparing different developmental stages, detecting the presence of a disease or abnormality, or determining the type of disease or abnormality.

In some embodiments, the targets in the biological sample may include one or more of peptides, proteins (e.g., antibodies, affibodies, or aptamers), nucleic acids (e.g., polynucleotides, DNA, RNA, or aptamers); polysaccharides (e.g., lectins or sugars), lipids, enzymes, enzyme substrates, ligands, receptors, antigens, or haptens. In some embodiments, targets may essentially include proteins or nucleic acids. One or more of the aforementioned targets may be characteristic of particular cells, while other targets may be associated with a particular disease or condition. In some embodiments, targets that may be detected and analyzed using the methods disclosed herein may include, but are not limited to, prognostic targets, hormone or hormone receptor targets, lymphoid targets, tumor targets, cell cycle associated targets, neural tissue and tumor targets, or cluster differentiation targets.

Suitable examples of prognostic targets may include enzymatic targets such as galactosyl transferase II, neuron specific enolase, proton ATPase-2, or acid phosphatase.

Suitable examples of hormone or hormone receptor targets may include human chorionic gonadotropin (HCG), adrenocorticotropic hormone, carcinoembryonic antigen (CEA), prostate-specific antigen (PSA), estrogen receptor, progesterone receptor, androgen receptor, gC1q-R/p33 complement receptor, IL-2 receptor, p75 neurotrophin receptor, PTH receptor, thyroid hormone receptor, or insulin receptor.

Suitable examples of lymphoid targets may include alpha-1-antichymotrypsin, alpha-1-antitrypsin, B cell target, bcl-2, bcl-6, B lymphocyte antigen 36 kD, BM1 (myeloid target), BM2 (myeloid target), galectin-3, granzyme B, HLA class I Antigen, HLA class II (DP) antigen, HLA class II (DQ) antigen, HLA class II (DR) antigen, human neutrophil defensins, immunoglobulin A, immunoglobulin D, immunoglobulin G, immunoglobulin M, kappa light chain, kappa light chain, lambda light chain, lymphocyte/histocyte antigen, macrophage target, muramidase (lysozyme), p80 anaplastic lymphoma kinase, plasma cell target, secretory leukocyte protease inhibitor, T cell antigen receptor (JOVI 1), T cell antigen receptor (JOVI 3), terminal deoxynucleotidyl transferase, or unclustered B cell target.

Suitable examples of tumour targets may include alpha fetoprotein, apolipoprotein D, BAG-1 (RAP46 protein), CA19-9 (sialyl lewisa), CA50 (carcinoma associated mucin antigen), CA125 (ovarian cancer antigen), CA242 (tumour associated mucin antigen), chromogranin A, clusterin (apolipoprotein J), epithelial membrane antigen, epithelial-related antigen, epithelial specific antigen, gross cystic disease fluid protein-15, hepatocyte specific antigen, heregulin, human gastric mucin, human milk fat globule, MAGE-1, matrix metalloproteinases, melan A, melanoma target (HMB45), mesothelin, metallothionein, microphthalmia transcription factor (MITF), Muc-1 core glycoprotein. Muc-1 glycoprotein, Muc-2 glycoprotein, Muc-5AC glycoprotein, Muc-6 glycoprotein, myeloperoxidase, Myf-3 (Rhabdomyosarcoma target), Myf-4 (Rhabdomyosarcoma target), MyoD1 (Rhabdomyosarcoma target), myoglobin, nm23 protein, placental alkaline phosphatase, prealbumin, prostate specific antigen, prostatic acid phosphatase, prostatic inhibin peptide, PTEN, renal cell carcinoma target, small intestinal mucinous antigen, tetranectin, thyroid transcription factor-1, tissue inhibitor of matrix metalloproteinase 1, tissue inhibitor of matrix metalloproteinase 2, tyrosinase, tyrosinase-related protein-1, villin, or von Willebrand factor.

Suitable examples of cell cycle associated targets may include apoptosis protease activating factor-1, bcl-w, bcl-x, bromodeoxyuridine, CAK (cdk-activating kinase), cellular apoptosis susceptibility protein (CAS), caspase 2, caspase 8, CPP32 (caspase-3), CPP32 (caspase-3), cyclin dependent kinases, cyclin A, cyclin B1, cyclin D1, cyclin D2, cyclin D3, cyclin E, cyclin G, DNA fragmentation factor (N-terminus), Fas (CD95), Fas-associated death domain protein, Fas ligand, Fen-1, IPO-38, Mcl-1, minichromosome maintenance proteins, mismatch repair protein (MSH2), poly (ADP-Ribose) polymerase, proliferating cell nuclear antigen, p16 protein, p27 protein, p34cdc2, p57 protein (Kip2), p105 protein, Stat 1 alpha, topoisomerase I, topoisomerase II alpha, topoisomerase III alpha, or topoisomerase II beta.

Suitable examples of neural tissue and tumor targets may include alpha B crystallin, alpha-internexin, alpha synuclein, amyloid precursor protein, beta amyloid, calbindin, choline acetyltransferase, excitatory amino acid transporter 1, GAP43, glial fibrillary acidic protein, glutamate receptor 2, myelin basic protein, nerve growth factor receptor (gp75), neuroblastoma target, neurofilament 68 kD, neurofilament 160 kD, neurofilament 200 kD, neuron specific enolase, nicotinic acetylcholine receptor alpha4, nicotinic acetylcholine receptor beta2, peripherin, protein gene product 9, S-100 protein, serotonin, SNAP-25, synapsin I, synaptophysin, tau, tryptophan hydroxylase, tyrosine hydroxylase, or ubiquitin.

Suitable examples of cluster differentiation targets may include CD1a, CD1b, CD1c, CD1d, CD1e, CD2, CD3delta, CD3epsilon, CD3gamma, CD4, CD5, CD6, CD7, CD8alpha, CD8beta, CD9, CD10, CD11a, CD11b, CD11c, CDw12, CD13, CD14, CD15, CD15s, CD16a, CD16b, CDw17, CD18, CD19, CD20, CD21, CD22, CD23, CD24, CD25, CD26, CD27, CD28, CD29, CD30, CD31, CD32, CD33, CD34, CD35, CD36, CD37, CD38, CD39, CD40, CD41, CD42a, CD42b, CD42c, CD42d, CD43, CD44, CD44R, CD45, CD46, CD47, CD48, CD49a, CD49b, CD49c, CD49d, CD49e, CD49f, CD50, CD51, CD52, CD53, CD54, CD55, CD56, CD57, CD58, CD59, CDw60, CD61, CD62E, CD62L, CD62P, CD63, CD64, CD65, CD65s, CD66a, CD66b, CD66c, CD66d, CD66e, CD66f, CD68, CD69, CD70, CD71, CD72, CD73, CD74, CDw75, CDw76, CD77, CD79a, CD79b, CD80, CD81, CD82, CD83, CD84, CD85, CD86, CD87, CD88, CD89, CD90, CD91, CDw92, CDw93, CD94, CD95, CD96, CD97, CD98, CD99, CD100, CD101, CD102, CD103, CD104, CD105, CD106, CD107a, CD107b, CDw108, CD109, CD114, CD115, CD116, CD117, CDw119, CD120a, CD120b, CD121a, CDw121b, CD122, CD123, CD124, CDw125, CD126, CD127, CDw128a, CDw128b, CD130, CDw131, CD132, CD134, CD135, CDw136, CDw137, CD138, CD139, CD140a, CD140b, CD141, CD142, CD143, CD144, CDw145, CD146, CD147, CD148, CDw149, CDw150, CD151, CD152, CD153, CD154, CD155, CD156, CD157, CD158a, CD158b, CD161, CD162, CD163, CD164, CD165, CD166, and TCR-zeta.

Other suitable prognostic targets may include centromere protein-F (CENP-F), giantin, involucrin, lamin A&C (XB 10), LAP-70, mucin, nuclear pore complex proteins, p180 lamellar body protein, ran, r, cathepsin D, Ps2 protein, Her2-neu, P53, 5100, epithelial target antigen (EMA), TdT, MB2, MB3, PCNA, or Ki67.

A signal from a signal generator may be detected using a variety of observation or detection systems. The nature of the detection system used may depend upon the nature of the signal generators used. The detection system may include, for example, a charge coupled device (CCD) detection system, complementary metal-oxide-semiconductor (CMOS) imaging detection system, a fluorescent detection system, an electrical detection system, a photographic film detection system, a chemiluminescent detection system, an enzyme detection system, an optical detection system, a near field detection system, or a total internal reflection (TIR) detection system.

One or more of the aforementioned techniques may be used to observe one or more characteristics of a signal from a signal generator (coupled with a binder or coupled with an enzyme substrate). In some embodiments, signal intensity, signal wavelength, signal location, signal frequency, or signal shift may be determined using one or more of the aforementioned techniques. In some embodiments, one or more aforementioned characteristics of the signal may be observed, measured, and recorded.

In some embodiments, the observed signal is a fluorescent signal, and a probe bound to a target in a biological sample may include a signal generator that is a fluorophore. In some embodiments, the fluorescent signal may be measured by determining fluorescence wavelength or fluorescent intensity using a fluorescence detection system. In some embodiments, a signal may be observed in situ, that is, a signal may be observed directly from the signal generator associated through the binder to the target in the biological sample. In some embodiments, a signal from the signal generator may be analyzed within the biological sample, obviating the need for separate array-based detection systems.

In some embodiments, observing a signal may include capturing an image of the biological sample. In some embodiments, a microscope connected to an imaging device may be used as a detection system, in accordance with the methods disclosed herein. In some embodiments, a signal generator (such as, fluorophore) may be excited and the signal (such as, fluorescence signal) obtained may be observed and recorded in the form of a digital signal (for example, a digitalized image). The same procedure may be repeated for different signal generators (if present) that are bound in the sample using the appropriate fluorescence filters.

In some embodiments, multiple different types of signals may be observed in the same sample. For example, one target may be detected with a fluorescent probe and a second target in the same sample may be detected with a chromogenic probe.

In some embodiments, the biological sample may be contacted with a morphological stain, or marker. A morphological stain may include a dye that may stain different cellular components, in order to facilitate identification of cell type or disease status. In some embodiments, the morphological stain may be readily distinguishable from the signal generators in the probes, that is, the stain may not emit signal that may overlap with signal from the probe. For example, for a fluorescent morphological stain, the signal from the morphological stain may not autofluoresce in the same wavelength as the fluorophores used in the probes.

In some embodiments, chromophores, fluorophores, enzymes, or enzyme substrates may be used as morphological stains. Suitable examples of chromophores that may be used as morphological stains (and their target cells, subcellular compartments, or cellular components) may include, but are not limited to, Eosin (alkaline cellular components, cytoplasm), Hematoxylin (nucleic acids), Orange G (red blood, pancreas, and pituitary cells), Light Green SF (collagen), Romanowsky-Giemsa (overall cell morphology), May-Grunwald (blood cells), Blue Counterstain (Trevigen), Ethyl Green (CAS) (amyloid), Feulgen-Naphthol Yellow S (DNA), Giemsa (differentially stains various cellular compartments), Methyl Green (amyloid), pyronin (nucleic acids), Naphthol-Yellow (red blood cells), Neutral Red (nuclei), Papanicolaou stain (a mixture of Hematoxylin, Eosin Y, Orange G and Bismarck Brown mixture (overall cell morphology)), Red Counterstain B (Trevigen), Red Counterstain C (Trevigen), Sirius Red (amyloid), Feulgen reagent (pararosanilin) (DNA), Gallocyanin chrom-alum (DNA), Gallocyanin chrom-alum and Naphthol Yellow S (DNA), Methyl Green-Pyronin Y (DNA), Thionin-Feulgen reagent (DNA), Acridine Orange (DNA), Methylene Blue (RNA and DNA), Toluidine Blue (RNA and DNA), Alcian blue (carbohydrates), Ruthenium Red (carbohydrates), Sudan Black (lipids), Sudan IV (lipids), Oil Red-O (lipids), Van Gieson's trichrome stain (acid fuchsin and picric acid mixture) (muscle cells), Masson trichrome stain (hematoxylin, acid fuchsin, and Light Green mixture) (stains collagen, cytoplasm, nucleioli differently), Aldehyde Fuchsin (elastin fibers), or Weigert stain (differentiates reticular and collagenous fibers).

Examples of suitable fluorescent morphological stains and, if applicable, their target cells, subcellular compartments, or cellular components, may include, but are not limited to, 4',6-diamidino-2-phenylindole (DAPI) (nucleic acids), Eosin (alkaline cellular components, cytoplasm), Hoechst 33258 and Hoechst 33342 (two bisbenzimides) (nucleic acids), Propidium Iodide (nucleic acids), Spectrum Orange (nucleic acids), Spectrum Green (nucleic acids), Quinacrine (nucleic acids), Fluorescein-phalloidin (actin fibers), Chromomycin A 3 (nucleic acids), Acriflavine-Feulgen reaction (nucleic acid), Auramine O-Feulgen reaction (nucleic acids), Ethidium Bromide (nucleic acids). Nissl stains (neurons), high affinity DNA fluorophores such as POPO, BOBO, YOYO and TOTO and others, and Green Fluorescent Protein fused to DNA binding protein, such as histones, ACMA, Quinacrine and Acridine Orange.

Examples of suitable enzymes, and their primary cellular locations or activities, may include, but are not limited to, ATPases (muscle fibers), succinate dehydrogenases (mitochondria), cytochrome c oxidases (mitochondria), phosphorylases (mitochondria), phosphofructokinases (mitochondria), acetyl cholinesterases (nerve cells), lactases (small intestine), acid phosphatases (lysosomes), leucine aminopeptidases (liver cells), dehydrogenases (mitochondria), myodenylate deaminases (muscle cells), NADH diaphorases (erythrocytes), and sucrases (small intestine).

In certain embodiments, a morphological stain may be stable towards the inactivating agent, that is, the signal generating properties of the morphological stain may not be substantially affected by the inactivating agent. In some embodiments, where a biological sample may be stained with a probe and a morphological stain at the same time, application of inactivating agent to modify the signal from the probe may not modify the signal from the morphological stain. In some embodiments, a morphological stain may be used as a control to co-register the molecular information, obtained through the iterative probing steps, and the morphological information, obtained through the morphological stains.

The methods disclosed herein involving the detection of protein, RNA, and DNA generally involve the use of binders that physically bind to the target in a specific manner. As such, in some embodiments, a binder may bind to a target with sufficient specificity, that is, a binder may bind to a target with greater affinity than it does to any other molecule. In some embodiments, the binder may bind to other molecules, but the binding may be such that the non-specific binding may be at or near background levels. In some embodiments, the affinity of the binder for the target of interest may be in a range that is at least 2-fold, at least 5-fold, at least 10-fold, or more than its affinity for other molecules. In some embodiments, binders with the greatest differential affinity may be employed, although they may not be those with the greatest affinity for the target.

In some embodiments, binding between the target and the binder may be affected by physical binding. Physical binding may include binding effected using non-covalent interactions. Non-covalent interactions may include, but are not limited to, hydrophobic interactions, ionic interactions, hydrogen-bond interactions, or affinity interactions (such as, biotin-avidin or biotin-streptavidin complexation). In some embodiments, the target and the binder may have areas on their surfaces or in cavities giving rise to specific recognition between the two resulting in physical binding. In some embodiments, a binder may bind to a biological target based on the reciprocal fit of a portion of their molecular shapes.

Binders and their corresponding targets may be considered as binding pairs, of which non-limiting examples include immune-type binding-pairs, such as, antigen/antibody, antigen/antibody fragment, or hapten/anti-hapten; nonimmune-type binding-pairs, such as biotin/avidin, biotin/streptavidin, folic acid/folate binding protein, hormone/hormone receptor, lectin/specific carbohydrate, enzyme/enzyme, enzyme/substrate, enzyme/substrate analog, enzyme/pseudo-substrate (substrate analogs that cannot be catalyzed by the enzymatic activity), enzyme/co-factor, enzyme/modulator, enzyme/inhibitor, or vitamin B12/intrinsic factor. Other suitable examples of binding pairs may include complementary nucleic acid fragments (including DNA sequences, RNA sequences, LNA sequences, and PNA sequences); Protein A/antibody; Protein G/antibody; nucleic acid/nucleic acid binding protein; or polynucleotide/polynucleotide binding protein.

In some embodiments, the binder may be a sequence-or structure-specific binder, wherein the sequence or structure of a target recognized and bound by the binder may be sufficiently unique to that target.

In some embodiments, the binder may be structure-specific and may recognize a primary, secondary, or tertiary structure of a target. A primary structure of a target may include specification of its atomic composition and the chemical bonds connecting those atoms (including stereochemistry), for example, the type and nature of linear arrangement of amino acids in a protein. A secondary structure of a target may refer to the general three-dimensional form of segments of biomolecules, for example, for a protein a secondary structure may refer to the folding of the peptide "backbone" chain into various conformations that may result in distant amino acids being brought into proximity with each other. Suitable examples of secondary structures may include, but are not limited to, alpha helices, beta pleated sheets, or random coils. A tertiary structure of a target may be is its overall three dimensional structure. A quaternary structure of a target may be the structure formed by its noncovalent interaction with one or more other targets or macromolecules (such as protein interactions). An example of a quaternary structure may be the structure formed by the four-globin protein subunits to make hemoglobin. A binder in accordance with the embodiments of the invention may be specific for any of the aforementioned structures.

An example of a structure-specific binder may include a protein-specific molecule that may bind to a protein target. Examples of suitable protein-specific molecules may include antibodies and antibody fragments, nucleic acids (for example, aptamers that recognize protein targets), or protein substrates (non-catalyzable).

In some embodiments, a binder may be sequence-specific. A sequence-specific binder may include a nucleic acid and the binder may be capable of recognizing a particular linear arrangement of nucleotides or derivatives thereof in the target. In some embodiments, the linear arrangement may include contiguous nucleotides or derivatives thereof that may each bind to a corresponding complementary nucleotide in the binder. In an alternate embodiment, the sequence may not be contiguous as there may be one, two, or more nucleotides that may not have corresponding complementary residues on the probe. Suitable examples of nucleic acid-based binders may include, but are not limited to, DNA or RNA oligonucleotides or polynucleotides. In some embodiments, suitable nucleic acids may include nucleic acid analogs, such as dioxygenin dCTP, biotin dcTP 7-azaguanosine, azidothymidine, inosine, or uridine.

Regardless of the type of binder and the target, in protein, DNA, and RNA detection, the specificity of binding between the binder and the target may also be affected depending on the binding conditions (for example, hybridization conditions in case of complementary nucleic acids). Suitable binding conditions may be realized by modulation one or more of pH, temperature, or salt concentration.

A binder may be intrinsically labeled (signal generator or enzyme attached during synthesis of binder) or extrinsically labeled (signal generator or enzyme attached during a later step). For example for a protein-based binder, an intrinsically labeled binder may be prepared by employing labeled amino acids. Similarly, an intrinsically labeled nucleic acid may be synthesized using methods that incorporate signal generator-labeled nucleotides directly into the growing nucleic acid. In some embodiments, a binder may be synthesized in a manner such that signal generators or enzymes may be incorporated at a later stage. For example, this latter labeling may be accomplished by chemical means by the introduction of active amino or thiol groups into nucleic acids of peptide chains. In some embodiments, a binder such a protein (for example, an antibody) or a nucleic acid (for example, a DNA) may be directly chemically labeled using appropriate chemistries.

In some embodiments, combinations of binders may be used that may provide greater specificity or in certain embodiments amplification of the signal. Thus, in some embodiments, a sandwich of binders may be used, where the first binder may bind to the target and serve to provide for secondary binding, where the secondary binder may or may not include a label, which may further provide for tertiary binding (if required) where the tertiary binding member may include a label.

Suitable examples of binder combinations may include primary antibody-secondary antibody, complementary nucleic acids, or other ligand-receptor pairs (such as biotin-streptavidin). Some specific examples of suitable binder pairs may include mouse anti-myc for recombinant expressed proteins with c-myc epitope; mouse anti-HisG for recombinant protein with His-Tag epitope, mouse anti-xpress for recombinant protein with epitope-tag, rabbit anti-goat for goat IgG primary molecules, complementary nucleic acid sequence for a nucleic acid; mouse anti-thio for thioredoxin fusion proteins, rabbit anti-GFP for fusion protein, jacalin for ?-D-galactose; and melibiose for carbohydrate-binding proteins, sugars, nickel couple matrix or heparin.

In some embodiments, a combination of a primary antibody and a secondary antibody may be used as a binder. A primary antibody may be capable of binding to a specific region of the target and the secondary antibody may be capable of binding to the primary antibody. A secondary antibody may be attached to a signal generator or an enzyme before binding to the primary antibody or may be capable of binding to a signal generator or an enzyme at a later step. In an alternate embodiment, a primary antibody and specific binding ligand-receptor pairs (such as biotin-streptavidin) may be used. The primary antibody may be attached to one member of the pair (for example biotin) and the other member (for example streptavidin) may be labeled with a signal generator or an enzyme. The secondary antibody, avidin, streptavidin, or biotin may be each independently labeled with a signal generator or an enzyme.

In some embodiments, the methods disclosed herein may be employed in an immunostaining procedure, and a primary antibody may be used to specifically bind a target protein. A secondary antibody may be used to specifically bind to the primary antibody, thereby forming a bridge between the primary antibody and a subsequent reagent (for example a signal generator or enzyme), if any. For example, a primary antibody may be mouse IgG (an antibody created in mouse) and the corresponding secondary antibody may be goat anti-mouse (antibody created in goat) having regions capable of binding to a region in mouse IgG.

In some embodiments, signal amplification may be obtained when several secondary antibodies may bind to epitopes on the primary antibody. In an immunostaining procedure a primary antibody may be the first antibody used in the procedure and the secondary antibody may be the second antibody used in the procedure. In some embodiments, a primary antibody may be the only antibody used in an immunostaining procedure.

The type of signal generator suitable for the methods disclosed herein may depend on a variety of factors, including the nature of the analysis being conducted, the type of the energy source and detector used, the type of inactivating agent employed, the type of binder, the type of target, or the mode of attachment between the binder and the signal generator (e.g., cleavable or non-cleavable).

A suitable signal generator may include a molecule or a compound capable of providing a detectable signal. A signal generator may provide a characteristic signal following interaction with an energy source or a current. An energy source may include electromagnetic radiation source and a fluorescence excitation source. Electromagnetic radiation source may be capable of providing electromagnetic energy of any wavelength including visible, infrared and ultraviolet. Electromagnetic radiation may be in the form of a direct light source or may be emitted by a light emissive compound such as a donor fluorophore. A fluorescence excitation source may be capable of making a source fluoresce or may give rise to photonic emissions (that is, electromagnetic radiation, directed electric field, temperature, physical contact, or mechanical disruption). Suitable signal generators may provide a signal capable of being detected by a variety of methods including optical measurements (for example, fluorescence), electrical conductivity, or radioactivity. Suitable signal generators may be, for example, light emitting, energy accepting, fluorescing, radioactive, or quenching.

A suitable signal generator may be sterically and chemically compatible with the constituents to which it is bound, for example, a binder. Additionally, a suitable signal generator may not interfere with the binding of the binder to the target, nor may it affect the binding specificity of the binder. A suitable signal generator may be organic or inorganic in nature. In some embodiments, a signal generator may be of a chemical, peptide or nucleic acid nature.

A suitable signal generator may be directly detectable. A directly detectable moiety may be one that may be detected directly by its ability to emit a signal, such as for example a fluorescent label that emits light of a particular wavelength following excitation by light of another lower, characteristic wavelength and/or absorb light of a particular wavelength.

A signal generator, suitable in accordance with the methods disclosed herein may be amenable to manipulation on application of a chemical agent. In some embodiments, a signal generator may be capable of being chemically destroyed on exposure to an inactivating agent. Chemical destruction may include complete disintegration of the signal generator or modification of the signal-generating component of the signal generator. Modification of the signal-generating component may include any chemical modification (such as addition, substitution, or removal) that may result in the modification of the signal generating properties. For example, unconjugating a conjugated signal generator may result in destruction of chromogenic properties of the signal generator. Similarly, substitution of a fluorescence-inhibiting functional group on a fluorescent signal generator may result in modification of its fluorescent properties. In some embodiments, one or more signal generators substantially resistant to inactivation by a specific chemical agent may be used as a control probe in the provided methods.

In some embodiments, a signal generator may be selected from a light emissive molecule, a radioisotope (e.g., P32 or H3, 14C, 125I and 131I), an optical or electron density marker, a Raman-active tag, an electron spin resonance molecule (such as for example nitroxyl radicals), an electrical charge transferring molecule (i.e., an electrical charge transducing molecule), a semiconductor nanocrystal, a semiconductor nanoparticle, a colloid gold nanocrystal, a microbead, a magnetic bead, a paramagnetic particle, or a quantum dot.

In some embodiments, a signal generator may include a light-emissive molecule. A light emissive molecule may emit light in response to irradiation with light of a particular wavelength. Light emissive molecules may be capable of absorbing and emitting light through luminescence (non-thermal emission of electromagnetic radiation by a material upon excitation), phosphorescence (delayed luminescence as a result of the absorption of radiation), chemiluminescence (luminescence due to a chemical reaction), fluorescence, or polarized fluorescence.

In some embodiments, a signal generator may essentially include a fluorophore. In some embodiments, a signal generator may essentially include a fluorophore attached to an antibody, for example, in an immunohistochemistry analysis. Suitable fluorophores that may be conjugated to a primary antibody include, but are not limited to, Fluorescein, Rhodamine, Texas Red, VECTOR Red, ELF (Enzyme-Labeled Fluorescence), Cy2, Cy3, Cy3.5, Cy5, Cy7, FluorX, Calcein, Calcein-AM, CRYPTOFLUOR, Orange (42 kDa), Tangerine (35 kDa), Gold (31 kDa), Red (42 kDa), Crimson (40 kDa), BHMP, BHDMAP, Br-Oregon, Lucifer Yellow, Alexa dye family, N-[6-(7-nitrobenz-2-oxa-1,3-diazol-4-yl) amino]caproyl] (NBD), BODIPY, boron dipyrromethene difluoride, Oregon Green, MITOTRACKER Red, Phycoerythrin, Phycobiliproteins BPE (240 kDa) RPE (240 kDa) CPC (264 kDa) APC (104 kDa), Spectrum Blue, Spectrum Aqua, Spectrum Green, Spectrum Gold, Spectrum Orange, Spectrum Red, Infra-Red (IR) Dyes, Cyclic GDP-Ribose (cGDPR), Calcofluor White, Lissamine, Umbelliferone, Tyrosine or Tryptophan. In some embodiments, a signal generator may essentially include a cyanine dye. In some embodiments, a signal generator may essentially include one or more a Cy3 dye, a Cy5 dye, or a Cy7 dye.

In some embodiments, the signal generator may be part of a FRET pair. FRET pair includes two fluorophores that are capable of undergoing FRET to produce or eliminate a detectable signal when positioned in proximity to one another. Some examples of donors may include Alexa 488, Alexa 546, BODIPY 493, Oyster 556, Fluor (FAM), Cy3, or TTR (Tamra). Some examples of acceptors may include Cy5, Alexa 594, Alexa 647, or Oyster 656.

As described hereinabove, one or more of the aforementioned molecules may be used as a signal generator. In some embodiments, one or more of the signal generators may not be amenable to chemical destruction and a cleavable linker may be employed to associate the signal generator and the binder. In some embodiments, one or more of the signal generators may be amenable to signal destruction and the signal generator may essentially include a molecule capable of being destroyed chemically. In some embodiments, a signal generator may include a fluorophore capable of being destroyed chemically by an oxidizing agent. In some embodiments, a signal generator may essentially include cyanine, coumarin, BODIPY, ATTO 658, a quantum dot or ATTO 634, capable of being destroyed chemically by an oxidizing agent. In some embodiments, a signal generator may include one or more a Cy3 dye, a Cy5 dye, or a Cy7 dye capable of being destroyed or quenched.

In some embodiments, a probe may include a binder coupled to an enzyme. In some embodiments, a suitable enzyme catalyzes a chemical reaction of the substrate to form a reaction product that can bind to a receptor (e.g., phenolic groups) present in the sample or a solid support to which the sample is bound. A receptor may be exogeneous (that is, a receptor extrinsically adhered to the sample or the solid-support) or endogeneous (receptors present intrinsically in the sample or the solid-support). Signal amplification may be effected as a single enzyme may catalyze a chemical reaction of the substrate to covalently bind multiple signal generators near the target.

In some embodiments, a suitable enzyme may also be capable of being inactivated by an oxidizing agent. Examples of suitable enzymes include peroxidases, oxidases, phosphatases, esterases, and glycosidases. Specific examples of suitable enzymes include horseradish peroxidase, alkaline phosphatase, β-D-galactosidase, lipase, and glucose oxidase. In some embodiments, the enzyme is a peroxidase selected from horseradish peroxidase, cytochrome C peroxidase, glutathione peroxidase, microperoxidase, myeloperoxidase, lactoperoxidase, and soybean peroxidase.

In some embodiments, a binder and an enzyme may be embodied in a single entity, for example a protein molecule capable of binding to a target and also catalyzing a chemical reaction of substrate. In other embodiments, a binder and an enzyme may be embodied in separate entities and may be coupled by covalent bond formation or by using ligand-receptor conjugate pairs (e.g., biotin streptavidin).

An enzyme substrate may be selected depending on the enzyme employed and the target available for binding in the sample or on the solid support. For example, in embodiments including HRP as an enzyme, a substrate may include a substituted phenol (e.g., tyramine). Reaction of HRP to the tyramine may produce an activated phenolic substrate that may bind to endogeneous receptors like electron-rich moieties (such as tyrosine or tryptophan) or phenolic groups present in the surface proteins of a biological sample. In alternate embodiments, where 3-methyl-2-benzothiazolinone hydrochloride (MBTH) may be employed as a substrate along with an HRP enzyme, exogeneous receptors like p-dimethylaminobenzaldehyde (DMAB) may be adhered to the solid support or the biological sample before reacting with the substrate.

In some embodiments, an enzyme substrate may be dephosphorylated after reaction with the enzyme. The dephosphorylated reaction product may be capable of binding to endogeneous or exogeneous receptors (e.g., antibodies) in the sample or the solid-support. For example, an enzyme may include alkaline phosphatase (AP) and a substrate may include NADP, substituted phosphates (e.g., nitrophenyl phosphate), or phosphorylated biotin. The receptors may include NAD binding proteins, antibodies to the dephosphorylated reaction product (e.g., anti nitro-phenol), avidin, or streptavidin accordingly.

In some embodiments, an enzyme may include β-galactosidase and a substrate may include β-galactopryanosyl-glycoside of fluorescein or coumarin. Receptors may include antibodies to deglycosylated moieties (e.g., anti-fluorescein or anti-coumarin). In some embodiments, multiple enzyme combinations like HRP/AP may be used as an enzyme. A substrate may include phosphorylated substituted phenol e.g., tyrosine phosphate, which may be dephosphorylated by AP before reacting with HRP to form a reaction product capable of binding to phenolic groups or electron rich moieties-based receptors.

A reaction product of the enzyme substrate may further be capable of being providing a detectable signal. In some embodiments, enzyme substrates employed in the methods disclosed herein may include non-chromogenic or non-chemiluminescent substrates, that is a reaction of the enzyme and the enzyme substrate may not itself produce a detectable signal. Enzyme substrates employed in the methods disclosed herein may include an extrinsic signal generator (e.g., a fluorophore) as a label. The signal generator and the enzyme substrate may be attached directly (e.g., an enzyme substrate with a fluorescent label) or indirectly (e.g., through ligand-receptor conjugate pair). In some embodiments, a substrate may include protected functional groups (e.g., sulfhydryl groups). After binding of the activated substrate to the receptors, the functional group may be deprotected and conjugation to a signal generator effected using a signal generator having a thiol reactive group (e.g., maleimide or iodoacetyl).

In some embodiments, a label may include horseradish peroxidase and the substrate is selected from substituted phenols (e.g., tyramine). In some embodiments, the horseradish peroxidase causes the activated phenolic substrate to covalently bind to phenolic groups present in the sample or a solid support to which the sample is bound. In some embodiments, a probe may include a binder coupled to HRP and a substrate may include tyramine-coupled to a fluorophore.

A chemical agent may include one or chemicals capable of modifying the signal generator, the enzyme, or the cleavable linker (if present) between the signal generator and the binder or the enzyme substrate. A chemical agent may be contacted with the sample in the form of a solid, a solution, a gel, or a suspension.

In some embodiments, a chemical agent may include oxidizing agents, for example, active oxygen species, hydroxyl radicals, singlet oxygen, hydrogen peroxide, or ozone. In some embodiments, a chemical agent may include hydrogen peroxide, potassium permanganate, sodium dichromate, aqueous bromine, iodine-potassium iodide, or t-butyl hydroperoxide.

One or more of the aforementioned chemical agents may be used in the methods disclosed herein depending upon the susceptibility of the signal generator, of the enzyme, of the binder, of the target, or of the biological sample to the chemical agent. In some embodiments, a chemical agent that essentially does not affect the integrity of the binder, the target, and the biological sample may be employed. In some embodiments, a chemical agent that does not affect the specificity of binding between the binder and the target may be employed. In some embodiments, an intensity value of a signal (for example, fluorescence intensity) may be measured and may be correlated to the amount of target in the biological sample.

A correlation between the amount of target and the signal intensity may be determined using calibration standards. In some embodiment, intensity values of the first and second signals may be measured and correlated to the respective target amounts. In some embodiments, by comparing the two signal intensities, the relative amounts of the first target and the second target (with respect to each other or with respect to a control) may be ascertained. Similarly, where multiple targets may be analyzed using multiple probes, relative amounts of different targets in the biological sample may be determined by measuring different signal intensities. In some embodiments, one or more control samples may be used as described hereinabove.

By observing a presence or absence of a signal in the samples (biological sample of interest versus a control), information regarding the biological sample may be obtained. For example by comparing a diseased tissue sample versus a normal tissue sample, information regarding the targets present in the diseased tissue sample may be obtained. Similarly by comparing signal intensities between the samples (i.e., sample of interest and one or more control), information regarding the expression of targets in the sample may be obtained.

In some embodiments, a location of the signal in the biological sample may be observed. In some embodiments, a localization of the signal in the biological signal may be observed using morphological stains. In some embodiments relative locations of two or more signals may be observed. A location of the signal may be correlated to a location of the target in the biological sample, providing information regarding localization of different targets in the biological sample. In some embodiments, an intensity value of the signal and a location of the signal may be correlated to obtain information regarding localization of different targets in the biological sample. For examples certain targets may be expressed more in the cytoplasm relative to the nucleus, or vice versa. In some embodiments, information regarding relative localization of targets may be obtained by comparing location and intensity values of two or more signals.

Exemplary Computer System and Network Environment

Systems and methods disclosed herein may include one or more programmable processing units having associated therewith executable instructions held on one or more non-transitory computer readable medium, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

Displays and/or other feedback components may also be included, for example, for rendering a graphical user interface, according to the present disclosure. The display and/or other feedback components may be stand-alone equipment or may be included as one or more components/modules of the processing unit(s). In exemplary embodiments, the display and/or other feedback components may be used to simultaneously describe both morphological and statistical representations of a field-of-view of a biological tissue sample.

The actual software code or control hardware which may be used to implement some of the present embodiments is not intended to limit the scope of such embodiments. For example, certain aspects of the embodiments described herein may be implemented in code using any suitable programming language type such as, for example, assembly code, C, C# or C++ using, for example, conventional or object-oriented programming techniques. Such code is stored or held on any type of suitable non-transitory computer-readable medium or media such as, for example, a magnetic or optical storage medium.

As used herein, a "processor," "processing unit," "computer" or "computer system" may be, for example, a wireless or wire line variety of a microcomputer, minicomputer, server, mainframe, laptop, personal data assistant (PDA), wireless e-mail device (for example, "BlackBerry," "Android" or "Apple," trade-designated devices), cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include non-transitory storage medium for storing software, including a hard disk, an optical disk, floppy disk, ROM (read only memory), RAM (random access memory), PROM (programmable ROM), EEPROM (electrically erasable PROM), flash memory storage devices, or the like.

Figure 8:
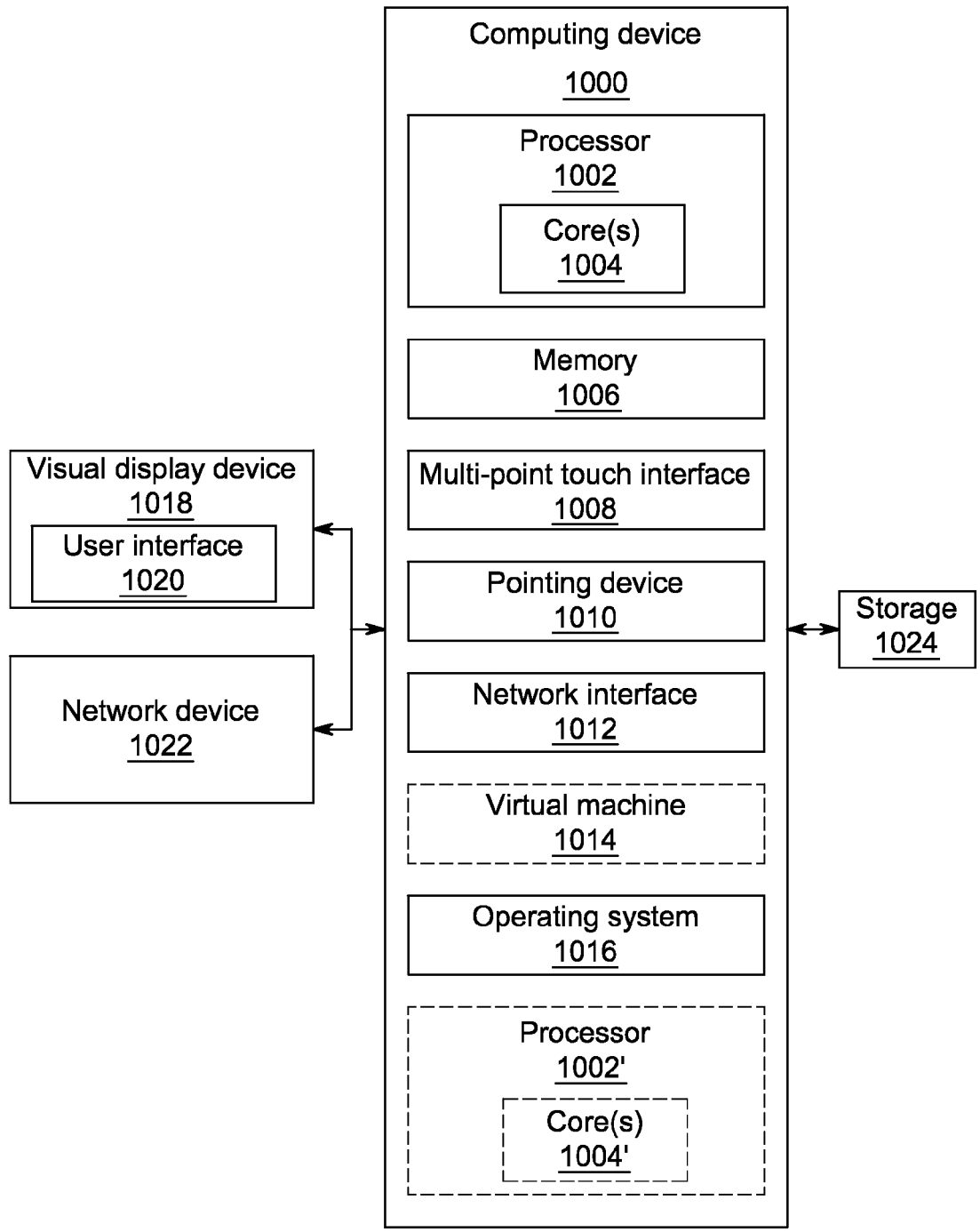
FIG. 8 depicts an exemplary computing system, in accordance with one embodiment.

FIG. 8 depicts a block diagram representing an exemplary computing device 1000 that may be used to implement the systems and methods disclosed herein. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. In exemplary embodiments, a distributed computational system may be provided comprising a plurality of such computing devices.

The computing device 1000 includes one or more non-transitory computer-readable media having encoded thereon one or more computer-executable instructions or software for implementing the exemplary methods described herein. The non-transitory computer-readable media may include, but are not limited to, one or more types of hardware memory and other tangible media (for example, one or more magnetic storage disks, one or more optical disks, one or more USB flash drives), and the like. For example, memory 1006 included in the computing device 1000 may store computer-readable and computer-executable instructions or software for implementing a graphical user interface as described herein. The computing device 1000 also includes processor 1002 and associated core 1004, and in some embodiments, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processor 1002 and processor(s) 1002' may each be a single core processor or a multiple core (1004 and 1004') processor.

Virtualization may be employed in the computing device 1000 so that infrastructure and resources in the computing device may be shared dynamically. A virtual machine 1014 may be provided to handle a process running on multiple processors so that the process appears to be using only one computing resource rather than multiple computing resources. Multiple virtual machines may also be used with one processor.

Memory 1006 may include a computer system memory or random access memory, such as DRAM, SRAM, EDO RAM, and the like. Memory 1006 may include other types of memory as well, or combinations thereof.

A user may interact with the computing device 1000 through a visual display device 1018, such as a screen or monitor, which may display one or more graphical user interfaces 1020 provided in accordance with exemplary embodiments described herein. The visual display device 1018 may also display other aspects, elements and/or information or data associated with exemplary embodiments. The computing device 1000 may include other I/O devices for receiving input from a user, for example, a keyboard or any suitable multi-point touch interface 1008, a pointing device 1010 (e.g., a mouse, a user's finger interfacing directly with a display device, etc.). The keyboard/multi-point touch interface 1008 and the pointing device 1010 may be coupled to the visual display device 1018. The computing device 1000 may include other suitable conventional I/O peripherals. The I/O devices may facilitate implementation of the one or more graphical user interfaces 1020, for example, implement one or more selection components of a graphical user interface (e.g., field-of-view selection components, biomarker selection components, biomarker expression level criteria selection components, morphological feature selection components, etc.) for exemplary embodiments described herein.

The computing device 1000 may include one or more storage devices 1024, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement exemplary embodiments as taught herein. In exemplary embodiments, the one or more storage devices 1024 may provide storage for data that may be generated by the systems and methods of the present disclosure. For example, storage device 1024 may provide storage for image data and/or storage for data analysis (e.g., storage for results of parameters for any of the image or statistical analyses described herein such as image segmentation results). The one or more storage devices 1024 may further provide storage for computer readable instructions relating to one or more methods as described herein. The one or more storage devices 1024 may be provided on the computing device 1000 and/or provided separately or remotely from the computing device 1000.

The computing device 1000 may include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein. The network device 1022 may include one or more suitable devices for receiving and transmitting communications over the network including, but not limited to, one or more receivers, one or more transmitters, one or more transceivers, one or more antennae, and the like.

The computing device 1000 may run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1016 may be run in native mode or emulated mode. In an exemplary embodiment, the operating system 1016 may be run on one or more cloud machine instances.

Figure 9:
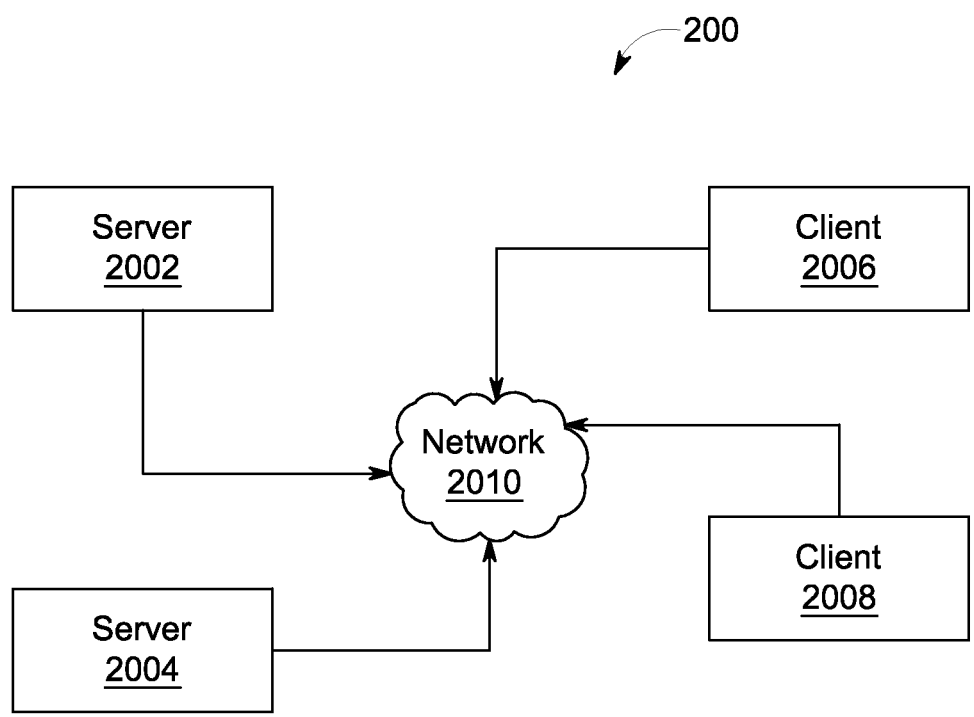
FIG. 9 depicts an exemplary network environment, in accordance with one embodiment.

FIG. 9 depicts an exemplary network environment 2000 suitable for implementation of embodiments disclosed herein. The network environment 2000 may include one or more servers 2002 and 2004 coupled to one or more clients 2006 and 2008 via a communication network 2010. Notably, each of the one or more servers 2002 and 2004 and one or more clients 2006 and 2008 may be implemented as a computing device 1000 as described with respect to FIG. 8. Thus, each of the one or more servers 2002 and 2004 and the one or more clients 2006 and 2008 may include a network interface 1012 and a network device 1022 to enable the servers 2002 and 2004 to communicate with the clients 2006 and 2008 via the communication network 2010. The communication network 2010 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 2010 are capable of supporting collaborative analysis and research efforts as disclosed herein.

In exemplary embodiments, collaborative entities may utilize the one or more clients 2006, 2008 to remotely access the one or more servers 2002, 2004. The servers 2002 and 2004 may advantageously provide a cloud environment for storing, accessing, sharing and analyzing (for example, validating) data related to the systems and methods of the present disclosure. The one or more servers 2006, 2008 may also advantageously be associated with one or more applications characterized, for example, by computer-readable instructions for implementing one or more modules relating to the generation of a user interface and/or data analysis, as described herein. The one or more applications may be advantageously be accessed and run remotely on the one or more clients 2006 and 2008. In exemplary embodiments, distribution of the one or more applications may be subject to a particular condition, such as a license agreement.

Having thus described several exemplary embodiments of the invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A computer-implemented method of processing image data representing biological units in a tissue sample, the computer including a processor, the method comprising:

receiving, by the processor, a first image of the tissue sample containing signals from an immunofluorescent (IF) morphological marker, wherein the tissue sample is stained with the IF morphological marker;

receiving, by the processor, a second image of the same tissue sample containing signals from a fluorescent probe, wherein the tissue sample is hybridized in situ with the fluorescent probe;

classifying, by the processor, each biological unit in the tissue sample into one of at least two classes based on a mean intensity of the signals from the IF morphological marker in the first image;

performing, by the processor, a fluorescence in situ hybridization (FISH) analysis of the tissue sample in the second image to obtain results therefrom;

filtering, by the processor, the results of the FISH analysis to produce a subset of the results pertaining to biological units classified in one of the at least two classes only;

registering, by the processor, locations of signals from the IF morphological marker in the first image with locations of signals from the fluorescent probe in the second image to produce a registered image:

segmenting, by the processor, the second image to identify nuclei in the tissue sample based on the locations of signals from the fluorescent probe in the second image and segmenting the nuclei includes applying, by the processor, a wavelet transform to the second image;

generating, by the processor, a Voronoi partition and rings generated from a threshold distance map from the nuclei in the second image in which each respective ring is constrained to at least partially surround only one nucleus in the tissue sample;

wherein the IF morphological marker is configured to target a cytokeratin (CK) protein, and wherein the method further comprises thresholding the first image using a threshold value in conjunction with Otsu's thresholding method and estimating a minimum intensity level of an epithelial region in the first image; and wherein each nucleus is classified as one of epithelial and non-epithelial by computing a mean cytokeratin (CK) intensity within the ring surrounding the nucleus and comparing the mean CK intensity to the estimated minimum intensity level of the epithelial region.

2. The method of claim 1, wherein the at least two classes include epithelial and non-epithelial.

3. The method of claim 1, wherein generating the Voronoi partition in the second image enables generating local background regions from the second image using nuclei identified in the tissue sample as seeds of the Voronoi partition multiplied by a mask defined by each ring.

4. The method of claim 1, further comprising changing the threshold value interactively by a user while observing a change in classification of each biological unit.

5. The method of claim 1, wherein the IF morphological marker includes a 4',6-diamidino-2-phenylindole (DAPI) stain.

6. The method of claim 1, wherein the IF morphological marker is configured to target at least one of a cytokeratin (CK) protein and a Human Epidermal Growth Factor Receptor 2 (HER2) protein.

7. The method of claim 1, wherein the fluorescent probe is configured to bind to least one of a HER2 gene and a Chromosome 17 centrometric repeat.

8. A non-transitory computer-readable medium having stored thereon computer-executable instructions that when executed by a computer cause the computer to:

receive a first image of a tissue sample containing signals from an immunofluorescent (IF) morphological marker, wherein the tissue sample is stained with the IF morphological marker;

receive a second image of the same tissue sample containing signals from a fluorescent probe, wherein the tissue sample is hybridized in situ with the fluorescent probe;

classify each biological unit in the tissue sample into one of at least two classes based on a mean intensity of the signals from the IF morphological marker in the first image;

perform a fluorescence in situ hybridization (FISH) analysis of the tissue sample in the second image to obtain results therefrom; and filter the results of the FISH analysis to produce a subset of the results pertaining to biological units classified as epithelial only;

register locations of signals from the IF morphological marker in the first image with locations of signals from the fluorescent probe in the second image to produce a registered image;

segment the second image to identify nuclei in the tissue sample based on the locations of signals from the fluorescent probe in the second image and segmenting the nuclei includes applying, by the processor, a wavelet transform to the second image;

generate a Voronoi partition and rings generated from a threshold distance map from the nuclei in the second image in which each respective ring is constrained to at least partially surround only one nucleus in the tissue sample;

wherein the IF morphological marker is configured to target a cytokeratin (CK) protein, and wherein the method further comprises thresholding the first image using a threshold value in conjunction with Otsu's thresholding method and estimating a minimum intensity level of an epithelial region in the first image; and wherein each nucleus is classified as one of epithelial and non-epithelial by computing a mean cytokeratin (CK) intensity within the ring surrounding the nucleus and comparing the mean CK intensity to the estimated minimum intensity level of the epithelial region.

9. A system for processing image data representing biological units in a tissue sample, the system comprising:

a processor;

an input in electrical communication with the processor and configured to receive the image data; and a memory in electrical communication with the processor, the memory including computer-executable instructions that when executed by the processor cause the processor to:

receive a first image of a tissue sample containing signals from an immunofluorescent (IF) morphological marker, wherein the tissue sample is stained with the IF morphological marker;

receive a second image of the same tissue sample containing signals from a fluorescent probe, wherein the tissue sample is hybridized in situ with the fluorescent probe;

classify each biological unit in the tissue sample into one of at least two classes based on a mean intensity of the signals from the IF morphological marker in the first image;

perform a fluorescence in situ hybridization (FISH) analysis of the tissue sample in the second image to obtain results therefrom; and filter the results of the FISH analysis to produce a subset of the results pertaining to biological units classified in one of the at least two classes only;

register locations of signals from the IF morphological marker in the first image with locations of signals from the fluorescent probe in the second image to produce a registered image;

segment the second image to identify nuclei in the tissue sample based on the locations of signals from the fluorescent probe in the second image and segmenting the nuclei includes applying, by the processor, a wavelet transform to the second image;

generate a Voronoi partition and rings generated from a threshold distance map from the nuclei in the second image in which each respective ring is constrained to at least partially surround only one nucleus in the tissue sample;

wherein the IF morphological marker is configured to target a cytokeratin (CK) protein, and wherein the method further comprises thresholding the first image using a threshold value in conjunction with Otsu's thresholding method and estimating a minimum intensity level of an epithelial region in the first image; and wherein each nucleus is classified as one of epithelial and non-epithelial by computing a mean cytokeratin (CK) intensity within the ring surrounding the nucleus and comparing the mean CK intensity to the estimated minimum intensity level of the epithelial region.

10. The system of claim 9, wherein the IF morphological marker includes a 4',6-diamidino-2-phenylindole (DAPI) stain.

11. The system of claim 9, wherein the IF morphological marker is configured to target at least one of a cytokeratin (CK) protein and a Human Epidermal Growth Factor Receptor 2 (HER2) protein.

12. The system of claim 9, wherein the fluorescent probe is configured to bind to least one of a HER2 gene and a Chromosome 17 centrometric repeat.

* * * * *